United States Patent
Usami

(10) Patent No.: US 8,824,180 B2
(45) Date of Patent: Sep. 2, 2014

(54) POWER CONVERSION APPARATUS

(75) Inventor: Yutaka Usami, Izunokuni (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 453 days.

(21) Appl. No.: 13/208,177

(22) Filed: Aug. 11, 2011

(65) Prior Publication Data

US 2012/0092909 A1    Apr. 19, 2012

(30) Foreign Application Priority Data

Oct. 18, 2010   (JP) ................................. 2010-233623

(51) Int. Cl.
  *H02M 7/217*  (2006.01)
  *H02M 1/00*   (2006.01)

(52) U.S. Cl.
  CPC ...... *H02M 7/217* (2013.01); *H02M 2001/0022* (2013.01)
  USPC ................................. 363/82; 363/89; 363/127

(58) Field of Classification Search
  CPC ....... H02M 7/217; H02M 7/219; H02M 7/23; H02M 7/25; H02M 2001/009; H02M 2007/5387
  USPC ......... 363/76, 77, 78–82, 89–90, 127, 39, 44, 363/45, 47, 84, 92, 21.06, 21.14
  See application file for complete search history.

(56) References Cited

U.S. PATENT DOCUMENTS

2005/0237771 A1* 10/2005 Franck et al. .................... 363/84
2007/0069581 A1*  3/2007 Mino .............................. 307/12

FOREIGN PATENT DOCUMENTS

| JP | 2001-178140 | 6/2001 |
| JP | 2007-110869 | 4/2007 |
| JP | 2008-295248 | 12/2008 |

* cited by examiner

*Primary Examiner* — Gary L Laxton
*Assistant Examiner* — Kyle J Moody
(74) *Attorney, Agent, or Firm* — Patterson & Sheridan, LLP

(57) ABSTRACT

A power conversion apparatus determines a peak value of circuit current in each pulse cycle and a lower limit value lower than the peak value, from a corrected output voltage value obtained by subtracting a predetermined reference voltage from an output voltage detected, and an input voltage detected. The pulse signal output unit outputs a pulse signal to the first switch when the polarity of input voltage is positive, and outputs a pulse signal to the second switch when the polarity of input voltage is negative. A pulse signal is turned on in response to start of a pulse cycle, and is kept on until a circuit current detected reaches a peak value. A pulse signal turns off when a circuit current reaches a peak value, and turns on again when a circuit current decreases to a lower limit value.

18 Claims, 13 Drawing Sheets

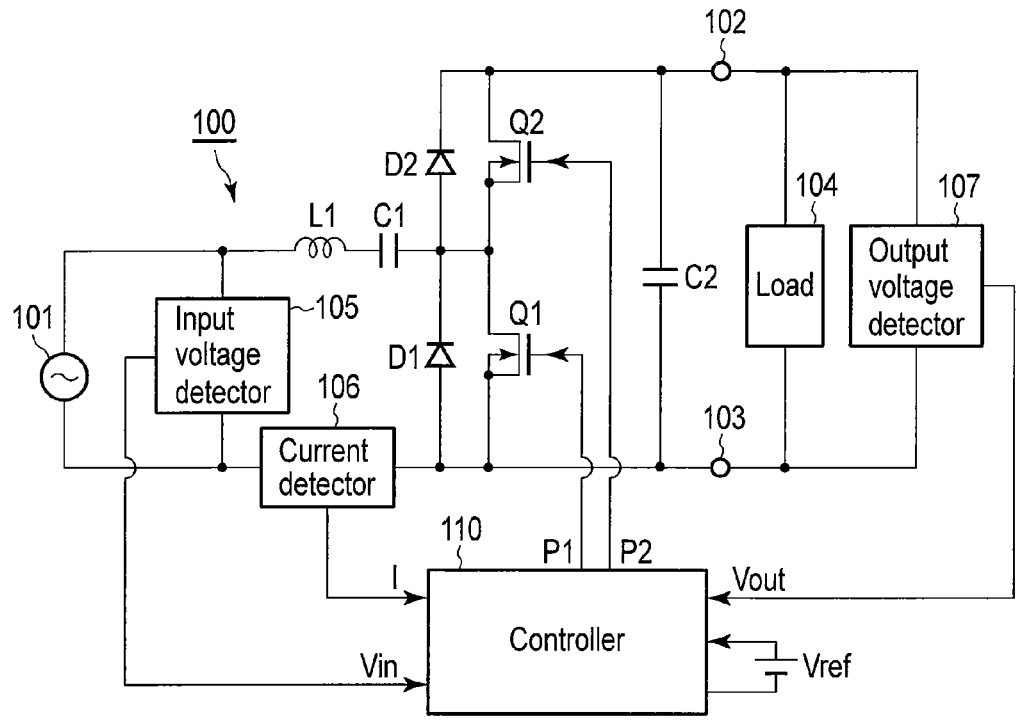
F I G. 1
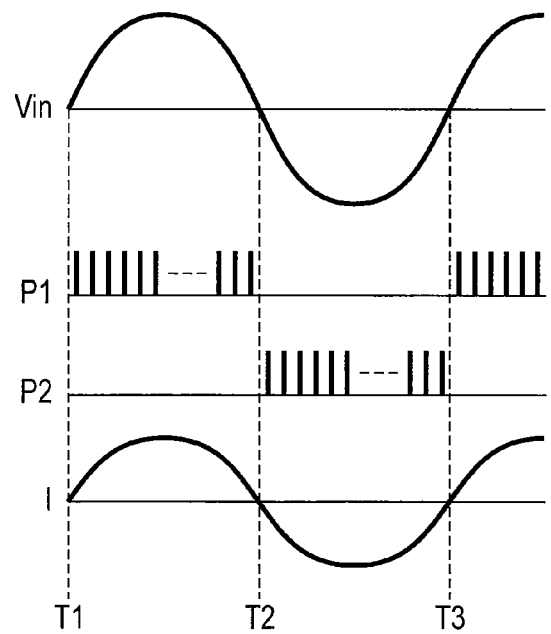
F I G. 2

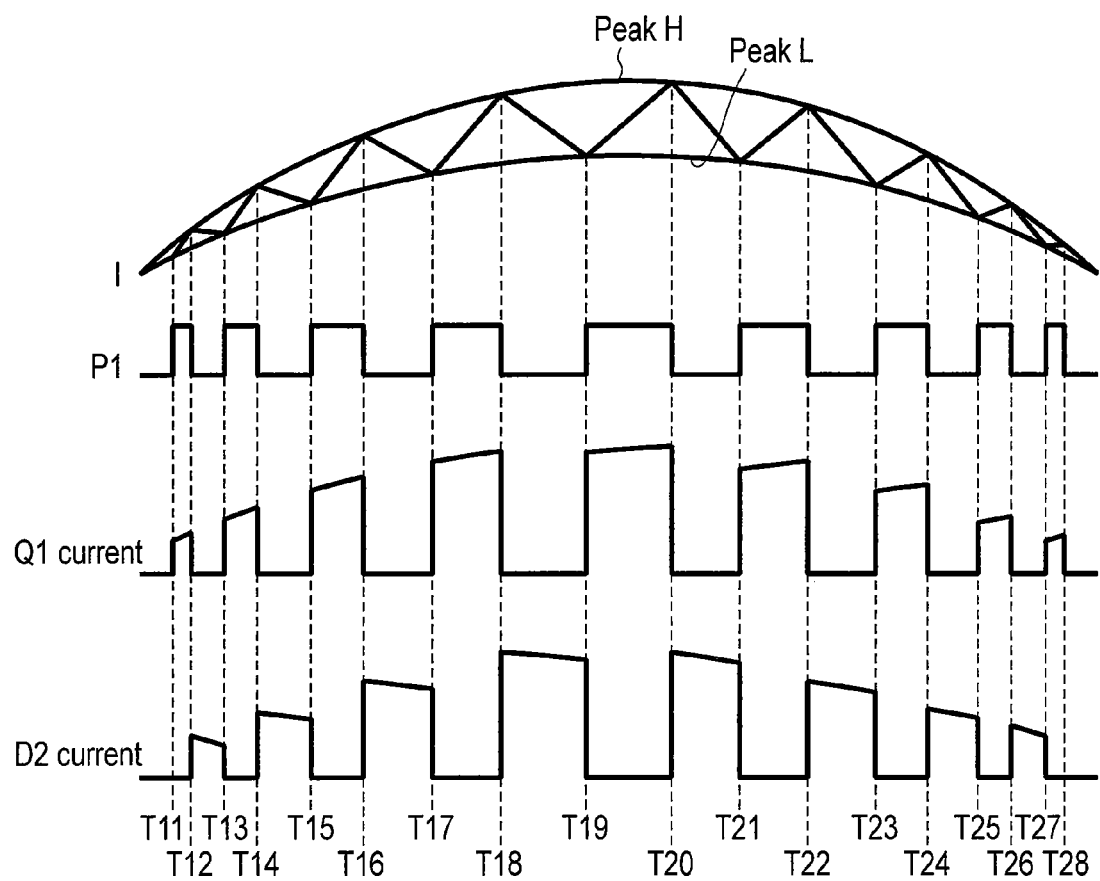
F I G. 4

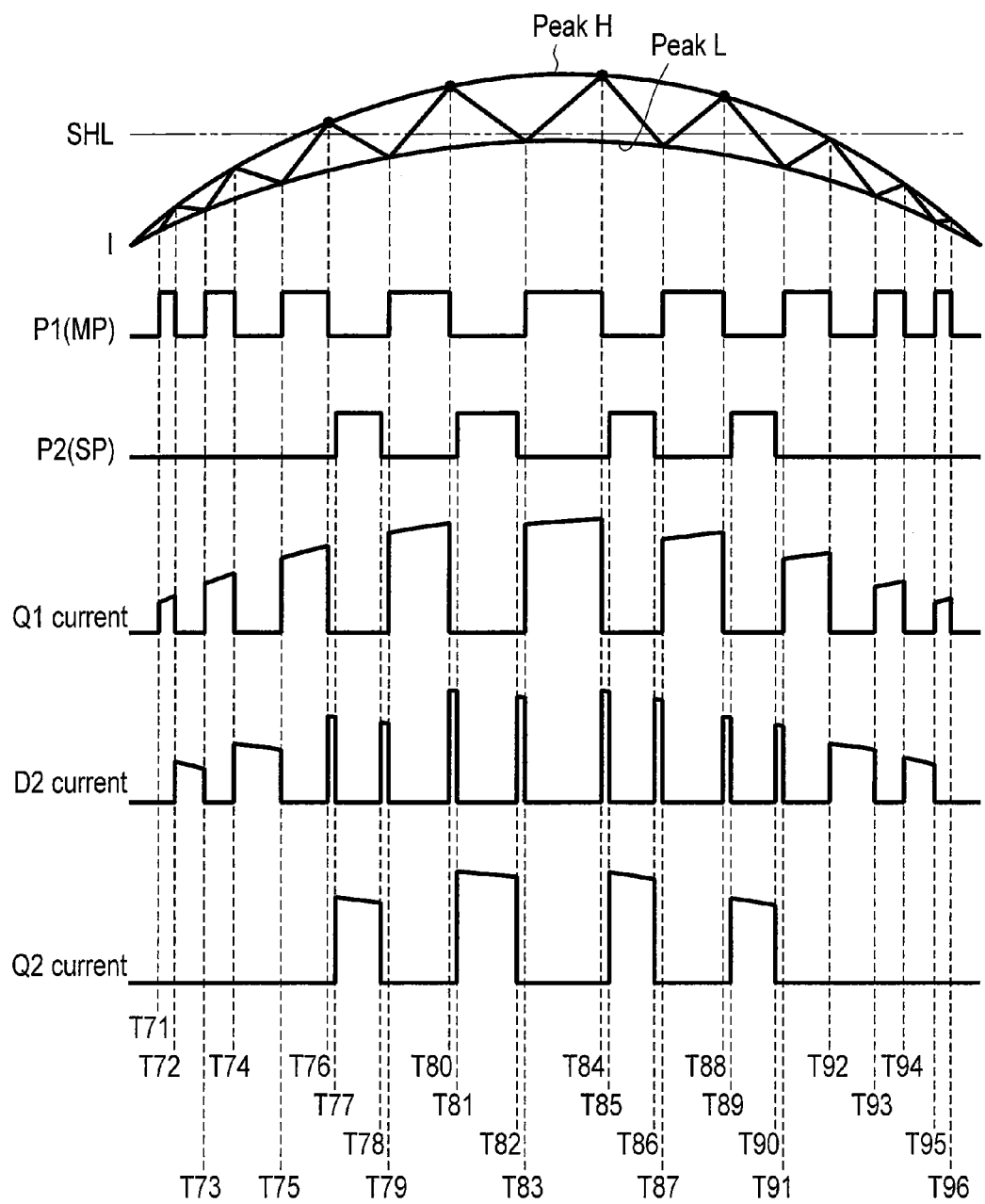
F I G. 12

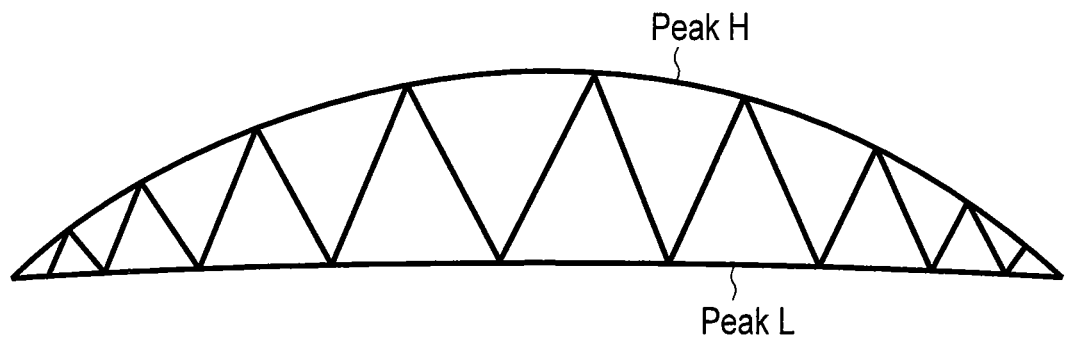
F I G. 14
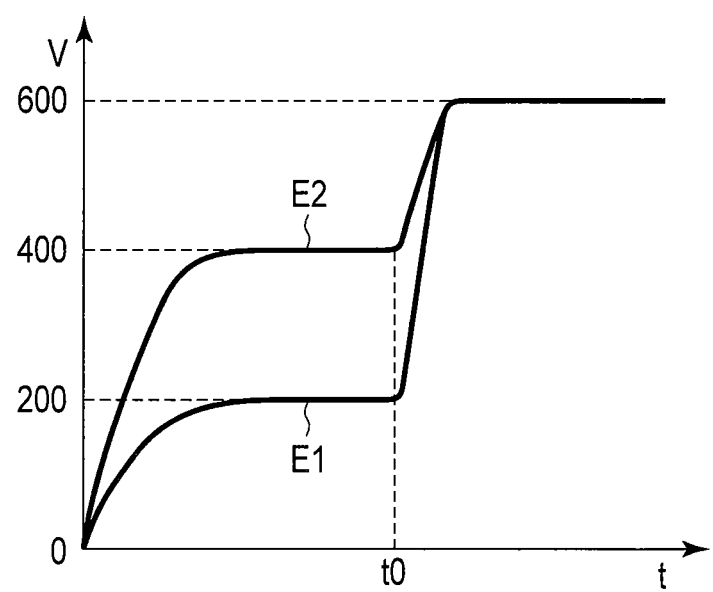
F I G. 15

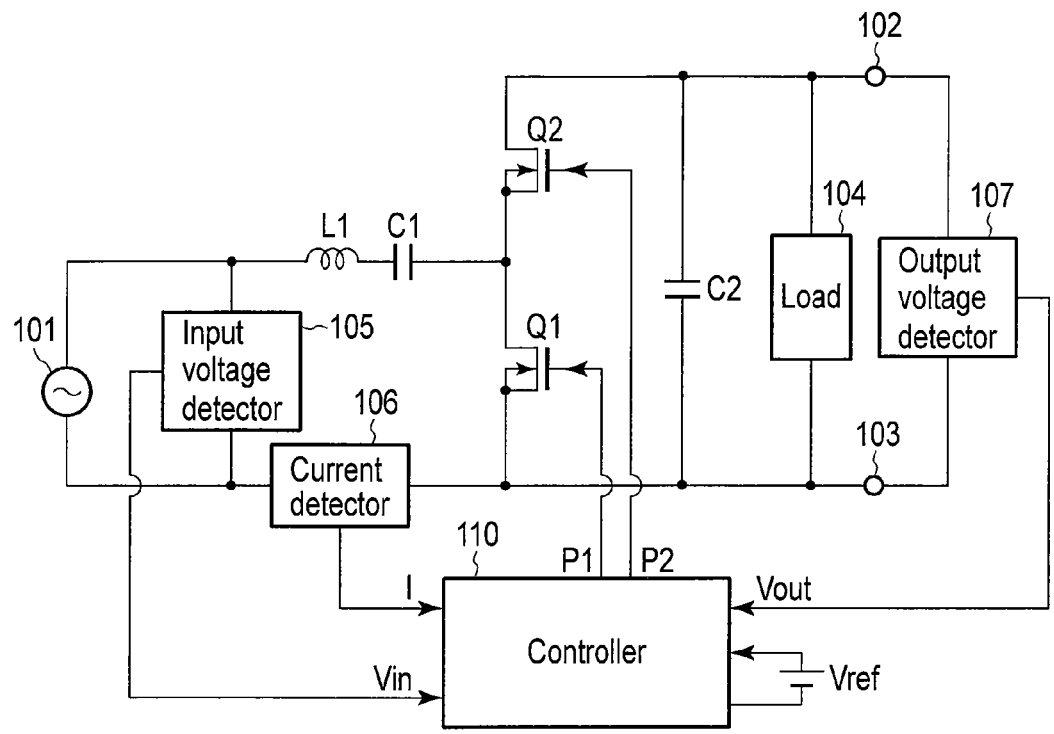
F I G. 16
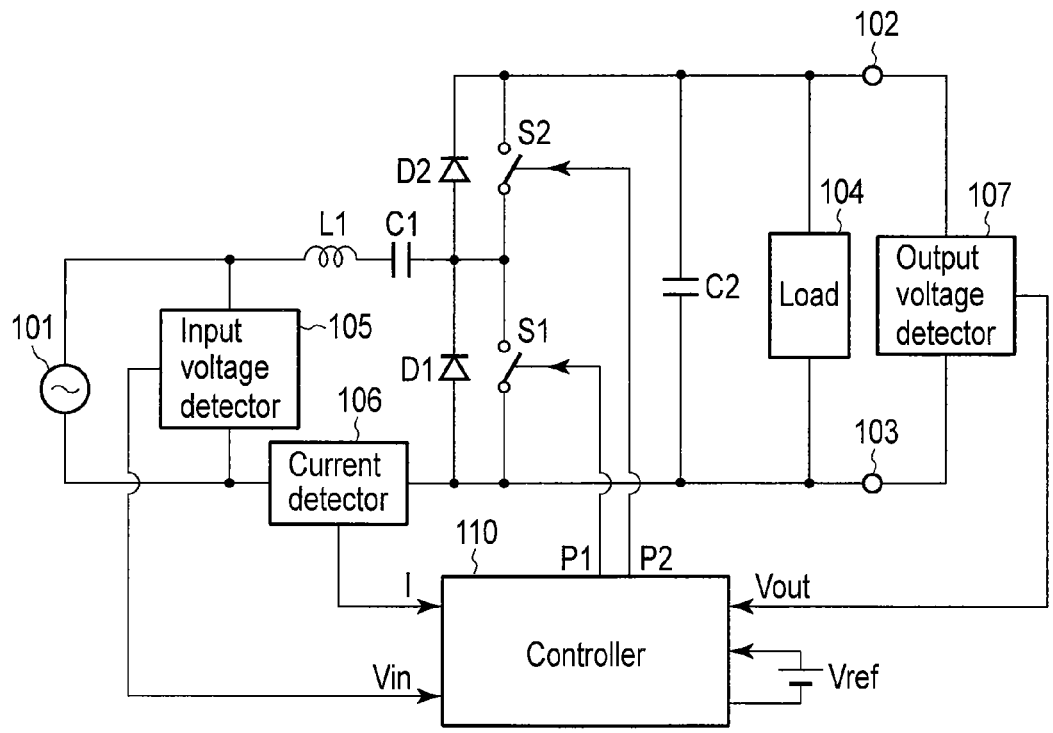
F I G. 17

US 8,824,180 B2

POWER CONVERSION APPARATUS

CROSS-REFERENCE TO RELATED APPLICATIONS

This application is based upon and claims the benefit of priority from prior Japanese Patent Application No. 2010-233623, filed on Oct. 18, 2010, the entire contents of which are incorporated herein by reference.

FIELD

Embodiments described herein relate generally to a power conversion apparatus, which converts AC voltage supplied from an AC power supply to DC voltage, and supplies power to a load.

BACKGROUND

There are two methods of converting an AC voltage to a DC voltage. A first method uses a diode bridge circuit and a smoothing capacitor. A diode bridge circuit performs full-wave rectification of an alternating current supplied from an AC power supply. A smoothing capacitor smoothes a direct current after full-wave rectification.

In the first method, a current always flows through a series circuit comprising two diodes in either case where an AC voltage is positive or negative. At this time, a power loss equivalent to the product of a current flowing through each diode and a forward voltage of a diode occurs in two diodes.

A second method uses a power factor converter (PFC) between a diode bridge circuit and a smoothing capacitor in the first method. A power factor converter increases the voltage of a direct current after full-wave rectification by a diode bridge circuit.

In the second method, a current flows in a series circuit comprising two diodes during full-wave rectification, and a power loss occurs. In addition, a current flows alternately in a field-effect transistor (FET) and diode comprising a power rector converter, causing additional loss.

Further, in a power factor converter, an output voltage must be set higher than an input voltage to obtain a sinusoidal waveform of an input current. However, a voltage required of a load is not necessarily higher than an input voltage. In such a case, a step-down converter is connected to a later stage of a power factor converter, thereby decreasing the voltage increased by a power factor converter to a desired value. A loss occurs while decreasing the voltage. As a whole unit, a power conversion apparatus comprises three stages of an AC-DC converter, a DC-DC (step-up) converter, and a DC-DC (step-down) converter. A power loss appears as a product of three stages. For example, assuming the efficiency of one stage to be 0.95, 0.95×0.95×0.95=0.86 for three stages. In other words, even the conversion efficiency is as high as 95%, the efficiency decreases to 86% in three stages. As seen above, even if the conversion efficiency of each stage is high, the conversion efficiency extremely decreases in multiple stages.

Nowadays, energy-saving electronic apparatus has been demanded. As a measure of saving energy, it is required to improve the conversion efficiency of a power conversion apparatus for supplying power to a load. However, the improvement of conversion efficiency is limited in a conventional circuit configuration.

BRIEF DESCRIPTION OF THE DRAWINGS

FIG. 1 is a circuit diagram of a power conversion apparatus of a first embodiment;

FIG. 2 is a timing chart showing the relationship between an input voltage Vin, a circuit current I, and first and second pulse signals in the first embodiment;

FIG. 4 is a timing chart showing a circuit current I, a first pulse signal P1, a current flowing through a first switch Q1, and a current flowing through a second diode D2 when the polarity of the input voltage Vin is positive, in the first embodiment;

FIG. 12 is a timing chart showing a circuit current I, a first pulse signal P1, a second pulse P2, a current flowing through a first switch Q1, a current flowing through a second diode D2, and a current flowing through a second switch Q2 when the polarity of the input voltage Vin is positive, in the third embodiment;

FIG. 14 is schematic diagram for explaining a modification of a minimum rated current (Peak L) for the circuit current I;

FIG. 15 is a waveform chart showing a voltage change on starting when 100 and 200 V AC power are supplied;

FIG. 16 is a circuit diagram showing a modification of a power conversion apparatus; and FIG. 17 is a circuit diagram showing another modification of a power conversion apparatus.

DETAILED DESCRIPTION

Figure 3:
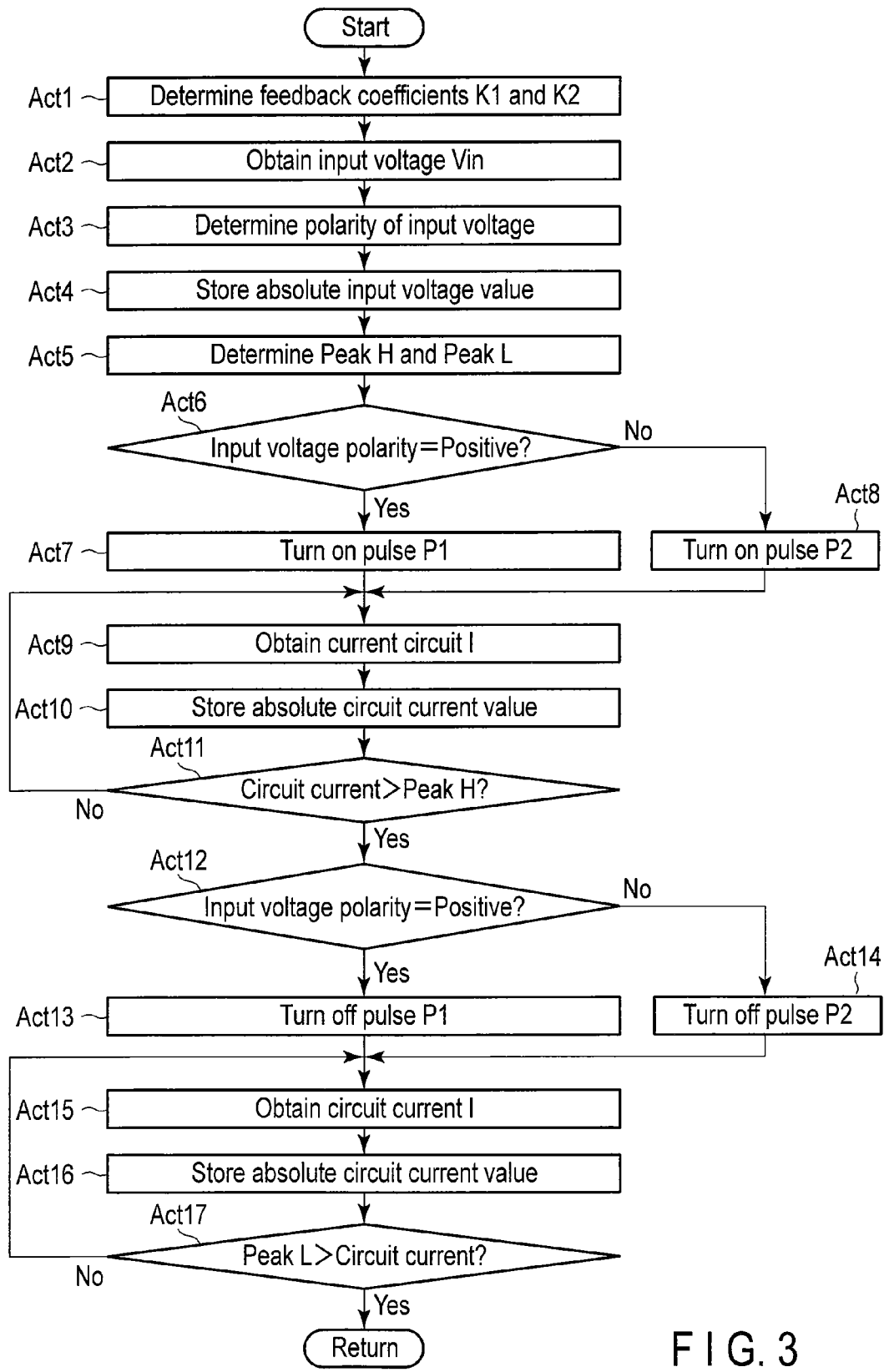
FIG. 3 is a flowchart showing a control procedure of a controller in the first embodiment.

In general, according to one embodiment, a power conversion apparatus includes a first switch, a second switch, an input voltage detector, a circuit current detector, an output voltage detector, a rated current value determinator, and a pulse signal output unit.

The first switch is connected at both ends of an AC power supply through an inductor and capacitor connected in series, and conducts when a pulse signal turns on, and becomes nonconductive when a pulse signal turns off. The second switch is connected at both ends of the first switch through a smoothing capacitor, and conducts when a pulse signal turns on, and becomes nonconductive when a pulse signal turns off. The input voltage detector detects a voltage of an AC power supply. The circuit current detector detects a circuit current flowing through an inductor. The output voltage detector detects a voltage across the ends of a smoothing capacitor. The rated current value determinator determines a peak value of circuit current in each pulse cycle and a lower limit value lower than the peak value, from a corrected output voltage value obtained by subtracting a predetermined reference voltage from an output voltage detected by the output voltage detector, and an input voltage detected by the input voltage detector. The pulse signal output unit outputs a pulse signal to the first switch when the polarity of input voltage is positive, and outputs a pulse signal to the second switch when the polarity of input voltage is negative. A pulse signal is turned on in response to start of a pulse cycle, and is kept on until a circuit current detected by the circuit current detector reaches a peak value. A pulse signal turns off when a circuit current reaches a peak value, and turns on again when a circuit current decreases to a lower limit value.

Hereinafter, embodiments of a power conversion apparatus, which are supplied with utility power of 100V (50/60 Hz) as an AC power supply, converts the AC power to a desired DC voltage, and powers a load with the converted DC power, will be explained with reference the accompanying drawings.

First Embodiment

A first embodiment is explained with reference to FIGS. 1 to 4. FIG. 1 is a circuit diagram showing a power conversion apparatus 100 of a first embodiment.

In the power conversion apparatus 100, a first semiconductor switch Q1 is connected at both ends of an AC power supply 101 through an inductor L1 and capacitor C1 connected in series. The switch Q1 uses an N-channel MOSFET. Specifically, one end of the capacitor C1 is connected to one end of the AC power supply 101 through an inductor L1. A drain terminal of the MOSFET is connected to the other end of the capacitor C1. A source terminal of the MOSFET is connected to the other end of the AC power supply 101.

In the power conversion apparatus 100, a second semiconductor switch Q2 is connected at both ends of the first semiconductor switch Q1 through a smoothing capacitor C2 connected in series. The switch Q2 uses an N-channel MOSFET. Specifically, a source terminal of the MOSFET is connected to a point connecting the capacitor C1 and switch Q1. A drain terminal of the MOSFET is connected to a positive-electrode terminal of the smoothing capacitor C2. A negative terminal of the smoothing capacitor C2 is connected to a point connecting the AC power supply 101 and switch Q1.

In the power conversion apparatus 100, a first external diode D1 is connected in parallel to the first switch Q1. Specifically, an anode of the first diode D1 is connected at a point connecting the first switch Q1 and AC power supply 101, and a cathode of the first diode D1 is connected at a point connecting the first switch Q1 and capacitor C1.

In the power conversion apparatus 100, a second external diode D2 is connected in parallel to the second switch Q2. Specifically, an anode of the second diode D2 is connected at a point connecting the second switch Q2 and capacitor C1, and a cathode of the second diode D2 is connected at a point connecting the second switch Q2 and smoothing capacitor C2.

The first diode D1 has a forward voltage lower than that of a body diode of the first semiconductor switch Q1. The second diode D2 has a forward voltage lower than that of a body diode of the second semiconductor switch Q2.

In the power conversion apparatus 100, both ends of the smoothing capacitor C2 are output terminals 102 and 103. A desired load 104 is connected between the output terminals 102 and 103.

In the power conversion apparatus 100, an input voltage detector 105 is connected at both ends of the AC power supply 101. The input voltage detector 105 detects an input voltage Vin generated across the ends of the AC power supply 101, and sends a detected signal to the controller 110.

In the power conversion apparatus 100, a circuit current detector 106 is connected between the AC power supply 101 and a point connecting the first switch Q1 and first diode D1. The circuit current detector 106 detects a circuit current I flowing through the inductor L1, and sends a detected signal to the controller 110.

In the power conversion apparatus 100, an output voltage detector 107 is connected between output terminals 102 and 103. The output voltage detector 107 detects a voltage Vout across the output terminals 102 and 103, and sends a detected signal to the controller 110.

The controller 110, which is supplied with the input voltage Vin, circuit current I, and output voltage Vout, is further supplied with a reference voltage Vref. The controller 110 compares the output voltage Vout with the reference voltage Vref, and determines whether the output voltage Vout is higher or lower than the reference voltage Vref.

The controller 110 generates first and second pulse signals P1 and P2, based on the input voltage Vin, circuit current I, and output voltage Vout. The controller 110 supplies a first pulse signal P1 to the first switch Q1, and a second pulse signal P2 to the second switch Q2. The first switch Q1 conducts each time the first pulse signal P1 is supplied. The second switch Q2 conducts each time the second pulse signal P2 is supplied.

FIG. 2 is a waveform chart showing the relationship between an input voltage Vin, a circuit current I, and first and second pulse signals. In FIG. 2, the polarity of the AC voltage Va is positive in sections T1 and T2. In these sections, the controller 110 generates a first pulse signal P1 at a frequency far higher than a cycle of the AC voltage Va.

In FIG. 2, the polarity of the AC voltage Va is negative in sections T2 and T3. In these sections, the controller 110 generates a second pulse signal P2 at a frequency far higher than a cycle of the AC voltage Va.

Therefore, when the polarity of the AC voltage Va is positive, the first switch Q1 alternately becomes conductive and nonconductive. When the polarity of the AC voltage Va is negative, the second switch Q2 alternately becomes conductive and nonconductive. As a result, the circuit current L flowing through the inductor L1 becomes sinusoidal similar to the input voltage Vin.

The controller 110 periodically takes in the output voltage Vout detected by the output voltage detector 107. Whenever taking in the output voltage Vout, the controller 110 calculates a corrected output voltage value obtained by subtracting the reference voltage Vref from the output voltage Vout, and integrates the corrected output voltage value at a low frequency.

At the timing to start supplying power to the load 104 (a pulse output cycle), the controller 110 determines a feedback coefficient K1. The feedback coefficient K1 becomes a value higher than "1" when the output voltage Vout is lower than the reference voltage Vref, and a value lower than "1" when the output voltage Vout is higher than the reference voltage Vref. Therefore, the feedback coefficient K1 makes the output voltage Vout close to the reference voltage Vref.

Further, the feedback coefficient K1 becomes high when the corrected output voltage value is high, and low when the corrected output voltage value is low. The feedback coefficient K1 is determined from the corrected output voltage value after low-frequency feedback, to prevent sudden feedback control in a circuit system. In other words, the feedback coefficient K1 gradually changes with the output voltage Vout.

FIG. 3 is a flowchart showing a control procedure of a controller 110. The controller 110 determines a low-frequency integrated value of a corrected output voltage value as a first feedback coefficient K1. The controller 110 determines a value obtained by multiplying the first feedback coefficient K1 by a certain ratio a (1>a>0), to be a second feedback coefficient K2. The controller 110 stores the first and second feedback coefficients K1 and K2 (K1>K2) in memory (Act 1: a rated current value determinator).

The controller 110 takes in the input voltage Vin (Act 2), determines the polarity of the input voltage Vin, and stores flag data about the polarity in a memory (Act 3). For example, the controller stores flag data "1" when the polarity is positive, and flag data "0" when the polarity is negative.

The controller 110 obtains an absolute input voltage value except a polarity from the input voltage Vin, and stores the obtained value in memory (Act 4). It is permitted to obtain the absolute input voltage value first, and store flag data in memory later by determining the polarity of the input voltage.

The controller 110 calculates a maximum rated current value (Peak H) by multiplying the absolute input voltage value by the first feedback coefficient K1. Similarly, the controller 110 calculates a minimum rated current value (Peak L) by multiplying the absolute input voltage value by the second feedback coefficient K2 (Act 5).

The controller 110 determines the polarity of the input voltage Vin from the flag data (Act 6). When the flag data is "1" or the polarity of the input voltage Vin is positive (Yes in Act 6), the controller 110 turns on the first pulse signal P1 (Act 7: a pulse signal output unit). When the flag data is "0" or the polarity of the input voltage Vin is negative (No in Act 6), the controller 110 turns on the second pulse signal P2 (Act 8: a pulse signal output unit).

The controller 110 takes in the circuit current I (Act 9), obtains an absolute circuit current value except a polarity from the circuit current I, and stores the obtained value in memory (Act 10).

The controller 110 determines whether the absolute circuit current value reaches the maximum rated current value (Peak H) (Act 11). When the absolute circuit current value does not reach the maximum rated current value (Peak H) (No in Act 11), the controller 110 takes in the circuit current I (Act 9), obtains an absolute circuit current value, and stores the obtained value in a memory (Act 10).

As described above, the controller 110 repeats the operations of Act 9 and Act 10 until the absolute circuit current value reaches the maximum rated current value (Peak H).

When the absolute circuit current value reaches the maximum rated current value (Peak H) (Yes in Act 11), the controller 110 determines the polarity of the input voltage Vin (Act 12). The controller 110 turns off the first pulse signal P1 (Act 13) when the polarity of the input voltage Vin is positive (Yes in Act 12), and turns off the second pulse signal P2 (Act 14) when the polarity of the input voltage Vin is negative (No in Act 12).

When the first or second pulse signal P1 or P2 turns off, the controller 110 takes in the circuit current I (Act 15), obtains an absolute circuit current value, and stores the obtained value in memory (Act 16).

The controller 110 determines whether the absolute circuit current value reaches the minimum rated current value (Peak L) (Act 17). When the absolute circuit current value does not reach the minimum rated current value (Peak L) (No in Act 17), the controller 110 takes in the circuit current I (Act 15), obtains an absolute circuit current value, and stores the obtained value in memory (Act 16).

As described above, the controller 110 repeats the operations of Act 15 and Act 16 until the absolute circuit current value decreases to the minimum rated current value (Peak L).

When the absolute circuit current value decreases to the minimum rated current value (Peak L) (Yes in Act 17), one cycle of pulse output is terminated. Then, the controller returns to the operation of Act 1, which is a first step of the control procedure, and moves to the next cycle. In other words, the controller 110 determines the first and second feedback coefficients K1 and K2 from the low-frequency integrated value of the corrected output voltage value. Thereafter, the controller 110 repeats the operations of Act 1 to Act 17 until supplying power to the load 104 is completed.

The controller 110, which executes the control procedure described above, may be configured with software or hardware.

In the power conversion apparatus configured as described above, when the polarity of the input voltage Vin is positive, the controller 110 sends the first pulse signal P1 to the first switch Q1. The first pulse signal P1 turns off when the circuit current I increases to a maximum rated current value (Peak H), and turns on when the circuit current decreases to a minimum rated current value (Peak L). In other words, the first pulse signal P1 turns on until the circuit current I reaches a maximum rated current value (Peak H) after once decreasing to a minimum rated current value (Peak L). The first pulse signal P1 turns off until the circuit current I returns to a minimum rated current value (Peak L) after once increasing to a maximum rated current value (Peak H).

FIG. 4 shows a circuit current I, a first pulse signal P1, a current flowing through a first switch Q1, and a current flowing through a second diode D2 when the polarity of the input voltage Vin is positive. In an embodiment of the power conversion apparatus 100, a frequency of the AC power supply 101 is set to 50 Hz, and switching frequencies of the first and second switches Q1 and Q2 are set to 100 kHz. However, a description of the operation at a frequency of 100 kHz becomes complicated, and the operation at a very loose frequency is described in the drawing.

In FIG. 4, a minimum rated current value (Peak 1) for the circuit current I is 70% of a maximum rated current value (Peak H). In other words, when the input voltage Vin is high and the maximum rated current value (Peak H) is 10 amperes (at timing T20 in FIG. 4), the minimum rated current value (Peak L) becomes 7 amperes (at timing T21 in FIG. 4). When the input voltage Vin is low and the maximum rated current value (Peak H) is 8 amperes (at timing T22 in FIG. 4), the minimum rated current value (Peak L) becomes 5.6 amperes (at timing T23 in FIG. 4). As described above, the values of the maximum rated current (Peak H) and minimum rated current (Peak L) are changed according to the input voltage Vin without changing the ratio.

As show in FIG. 4, the envelope curves of the maximum rated current value (Peak H) and minimum rated current value (Peak L) for the circuit current I are sinusoidal similar to the waveform of the input voltage Vin. Once the first pulse signal P1 is turned on, it is kept on until the circuit current I reaches the maximum rated current value (Peak H) (at timing T11, T13, T15, T17, T19, T21, T23, T25 and T27).

When the circuit current I reaches the maximum rated current value (Peak H) (at timing T12, T14, T16, T18, T20, T22, T24, T26 and T28), the first pulse signal P1 turns off. Thereafter, when the circuit current I decreases to the minimum rated current value (Peak L) (at timing T13, T15, T17, T19, T21, T23, T25 and T27), the first pulse signal P1 turns on again. Thereafter, until the polarity of the input voltage Vin becomes negative, the first pulse signal P1 repeats turning on and off as described above.

When the first pulse signal P1 turns on, the first switch Q1 conducts. When the first switch Q1 conducts, a closed circuit comprising an AC power supply 101, an inductor L1, a capacitor C1, and a first switch Q1 is formed. As a result, a current flows from the capacitor C1 to the first switch Q1 (in sections T11-T12, T13-T14, T15-T16, T17-T18, T19-T20, T21-T22, T23-T24, T25-T26, and T27-T28).

When the first pulse signal P1 turns off, the first switch Q1 becomes nonconductive. When the first switch Q1 becomes nonconductive, the current flowing through the first switch Q1 becomes zero. At this time, the inductor L1 tends to flow a current in the same direction by the energy of a reactor. Therefore, a current flows into the smoothing capacitor C2 through the second diode D2 connected in parallel to the second switch Q2 (in sections T12-T13, T14-T15, T16-T17, T18-T19, T20-T21, T22-T23, T24-T25, and T26-T27).

Each time the first pulse signal P1 turns on and off, the power conversion apparatus 100 repeats the above operation. As a result, the power conversion apparatus 100 charges the smoothing capacitor C2 while increasing the output voltage Vout generated across the output terminals 102 and 103.

On the other hand, when the polarity of the input voltage Vin is negative, a second pulse signal P2 is supplied from the controller 110 to the second switch Q2. The second pulse signal P2 is kept on until the circuit current I reaches a maximum rated current (Peak H), and turns off when the circuit current reaches a maximum rated current value (Peak H). When the absolute value of the circuit current I decreases to a minimum rated current value (Peak L), the second pulse signal P2 turns on again. Thereafter, the second pulse signal P2 repeats turning on and off until the polarity of the input voltage Vin becomes positive.

When the second pulse signal P2 turns on, the second switch Q2 conducts. When the second switch Q2 conducts, a closed circuit comprising an AC power supply 101, an inductor L1, a capacitor C1, a second switch Q2, and a smoothing capacitor C2 is formed. At this time, the voltage of the smoothing capacitor C2 is higher than the AC voltage Va. As a result, the power conversion apparatus 100 is operated so that the charging voltage of the smoothing capacitor C2 returns to the AC power supply 101 through the second switch Q2 and inductor L1. Therefore, a current flows from the smoothing capacitor C2 to the second switch Q2.

When the second pulse signal P2 turns off, the second switch Q2 becomes nonconductive. When the second switch Q2 becomes nonconductive, the current flowing through the second switch Q2 becomes zero. At this time, the inductor L1 tends to flow a current in the same direction by the energy of a reactor. Therefore, a current flows into the capacitor C1 through the first diode D1 connected in parallel to the first switch Q1.

Each time the second pulse signal P2 turns on and off, the power conversion apparatus 100 repeats the above operation. As a result, the power conversion apparatus 100 recharges the capacitor C1.

The polarity of the AC voltage Va alternately becomes positive and negative. Therefore, the power conversion apparatus 100 repeats charging the smoothing capacitor C2 and recharging the capacitor C1. In other words, the power conversion apparatus 100 charges the smoothing capacitor C2 after recharging the capacitor C1. Therefore, when the smoothing capacitor C2 is charged, the electric charge stored in the capacitor C1 is moved to the smoothing capacitor C2.

If the first and second switch Q1 and Q2 do not operate, the circuit of the power conversion apparatus 100 shown in FIG. 1 functions as a voltage doubler circuit. In other words, when the input voltage is 100 V AC, for example, a DC voltage of about 200 V is generated across the output terminals 102 and 103.

As described above, when the first and second switch Q1 and Q2 operate, the electric charge stored in the capacitor C1 is moved to the smoothing capacitor C2. Therefore, the pressor effect of the power conversion apparatus 100 is added. As a result, the power conversion apparatus 100 increases the input AC voltage Va to a value higher than the value double the input voltage, and obtains a DC output voltage Vout equivalent to the reference voltage Vref.

As described above, according to the first embodiment, the power conversion apparatus 100 can supply power to the load 104 by converting the AC voltage obtained from the AC power supply 101 to a DC voltage without full-wave rectification. Since a diode bridge circuit for full-wave rectification is unnecessary, the number of circuit components is reduced, and the cost is reduced. Further, in the power conversion apparatus 100, a loss caused by a forward voltage generated in a diode bridge is eliminated, and efficient power conversion is realized.

Further, in the power conversion apparatus 100 the input current is controlled to have a sinusoidal waveform similar to the waveform of the input voltage. Therefore, the input current becomes sinusoidal. This prevents a harmonic in the input current, and realizes power conversion with reduced noise. Generally, it is necessary to provide a power factor converter (PFC) to prevent harmonics in an input current. A power factor converter is unnecessary in the power conversion apparatus 100. In other words, the power conversion apparatus 100 realizes the functions of full-wave rectifier and power factor converter with one circuit, and increases the conversion efficiency.

Further, as apparent from FIG. 4, the circuit current I flowing through the inductor L1 is controlled in a range of a maximum rated current value (Peak H) to a minimum rated current value (Peak L). Therefore, the difference between a peak value and an average value is small. The ratings of circuit components such as semiconductor switches Q1 and Q2 are determined by a peak value of circuit current. If a peak value is extremely different from an average value of circuit current, the cost of circuit components is increased. On the other hand, in the power conversion apparatus 100, the difference between a peak value and an average value of circuit current can be reduced, and allowance can be given to the ratings of magnetic saturation of the inductor L1, ripple current of the capacitor C1, and maximum currents of the first and second semiconductor switches Q1 and Q2. As a result, the power conversion apparatus 100 realizes reduction of costs.

Second Embodiment

A second embodiment is explained with reference to FIGS. 5 to 8. The circuit configuration of a power conversion apparatus 200 is similar to that of the first embodiment. Therefore, FIG. 1 is used, and the parts common to those in FIG. 1 are given the same reference numbers, and detailed explanation therefore is omitted.

Figure 5:
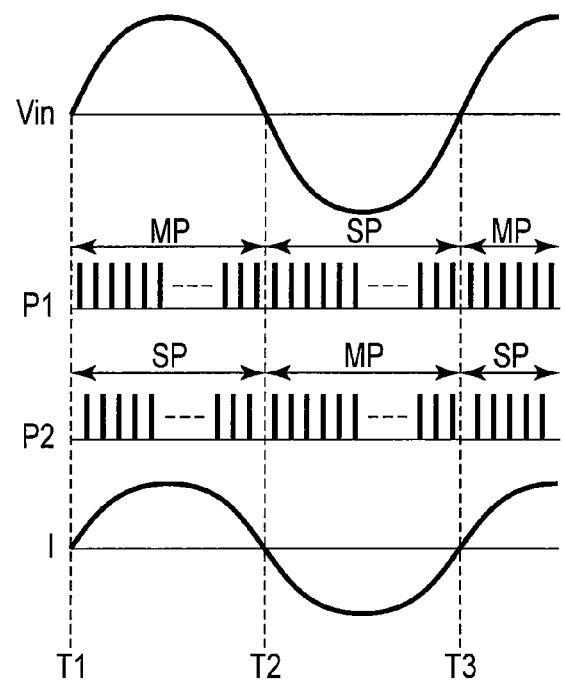
FIG. 5 is a timing chart showing the relationship between an input voltage Vin, a circuit current I, and first and second pulse signals P1 and P2 in the second embodiment.

FIG. 5 is a waveform chart showing the relationship between an input voltage Vin, a circuit current I, and first and second pulse signals P1 and P2 in a power conversion apparatus 200. In FIG. 5, the polarity of the AC voltage Va is positive in sections T1 and T2. In the positive polarity sections, the controller 110 generates a first pulse signal P1 at a frequency far higher than a cycle of the AC voltage Va. In the second embodiment, a first pulse signal P1 in a section where the polarity of the AC voltage Va is positive is called a main pulse signal MP for the first switch Q1.

Further, in a section where the polarity of the AC voltage Va is positive, the controller 110 generates a second pulse signal P2 each time the first pulse signal P1 turns off. In the second embodiment, a second pulse signal P2 in a section where the polarity of the AC voltage Va is positive is called a sub-pulse signal SP for the second switch Q2.

In FIG. 5, the polarity of the AC voltage Va is negative in sections T2 and T3. In the negative polarity sections, the controller 110 generates a second pulse signal P2 at a frequency far higher than a cycle of the AC voltage Va. In the second embodiment, a second pulse signal P2 in a section where the polarity of the AC voltage Va is negative is called a main pulse signal MP for the second switch Q2.

Further, in a section where the polarity of the AC voltage Va is negative, the controller 110 generates a first pulse signal P1 each time the second pulse signal P2 turns off. In the second embodiment, a first pulse signal P1 in a section where the polarity of the AC voltage Va is negative is called a sub-pulse signal SP for the first switch Q1.

As described above, also in the second embodiment, the first switch Q1 repeats conducting and non-conducting in the sections where the polarity of the AC voltage Va is positive, and the second switch Q2 repeats conducting and non-conducting in the sections where the polarity of the AC voltage Va is negative. As a result, the circuit current I flowing through the inductor L1 becomes sinusoidal similar to the input voltage Vin.

Figure 6:
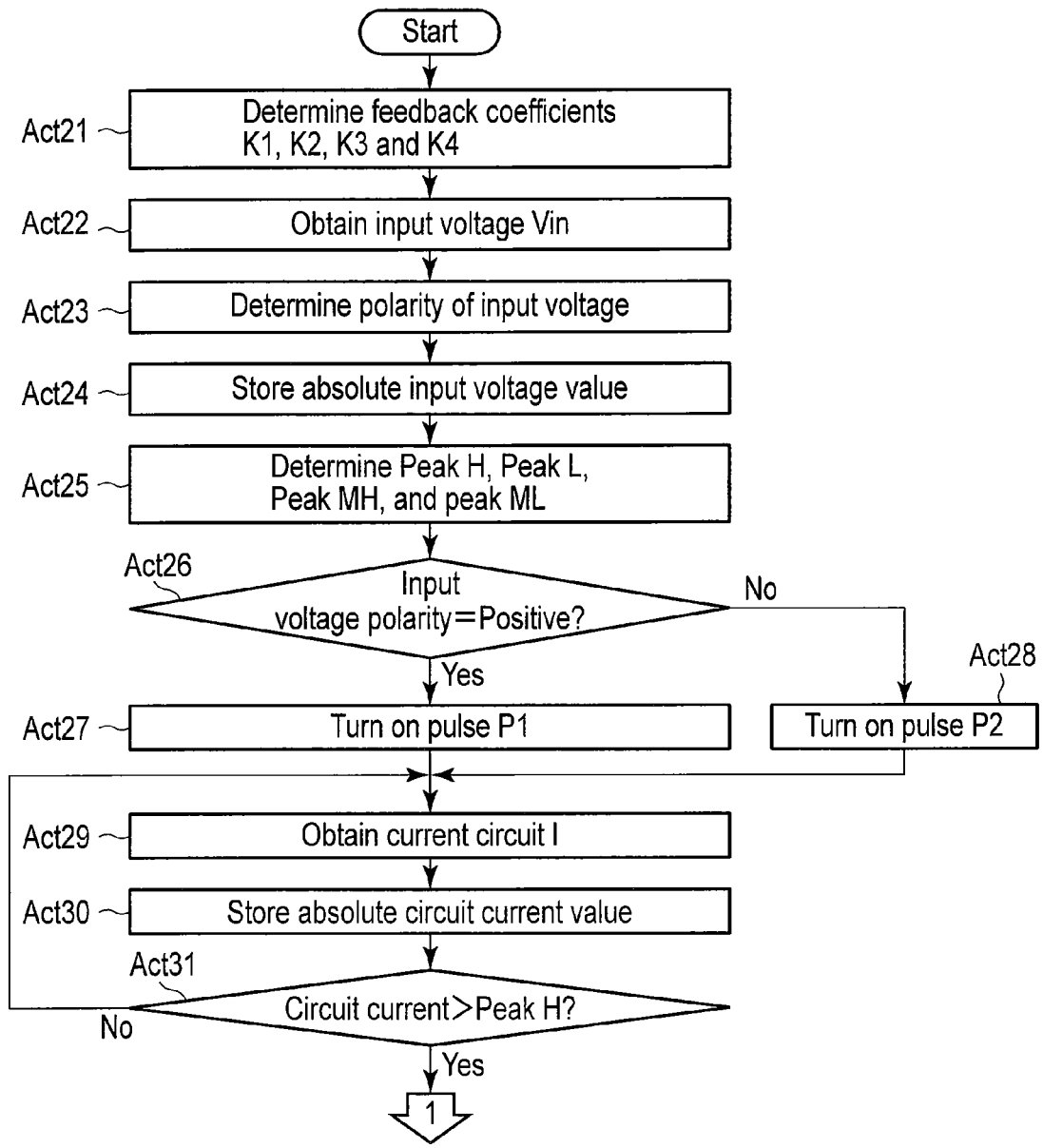
FIG. 6 is a flowchart showing the first half of a control procedure of a controller in the second embodiment.
Figure 7:
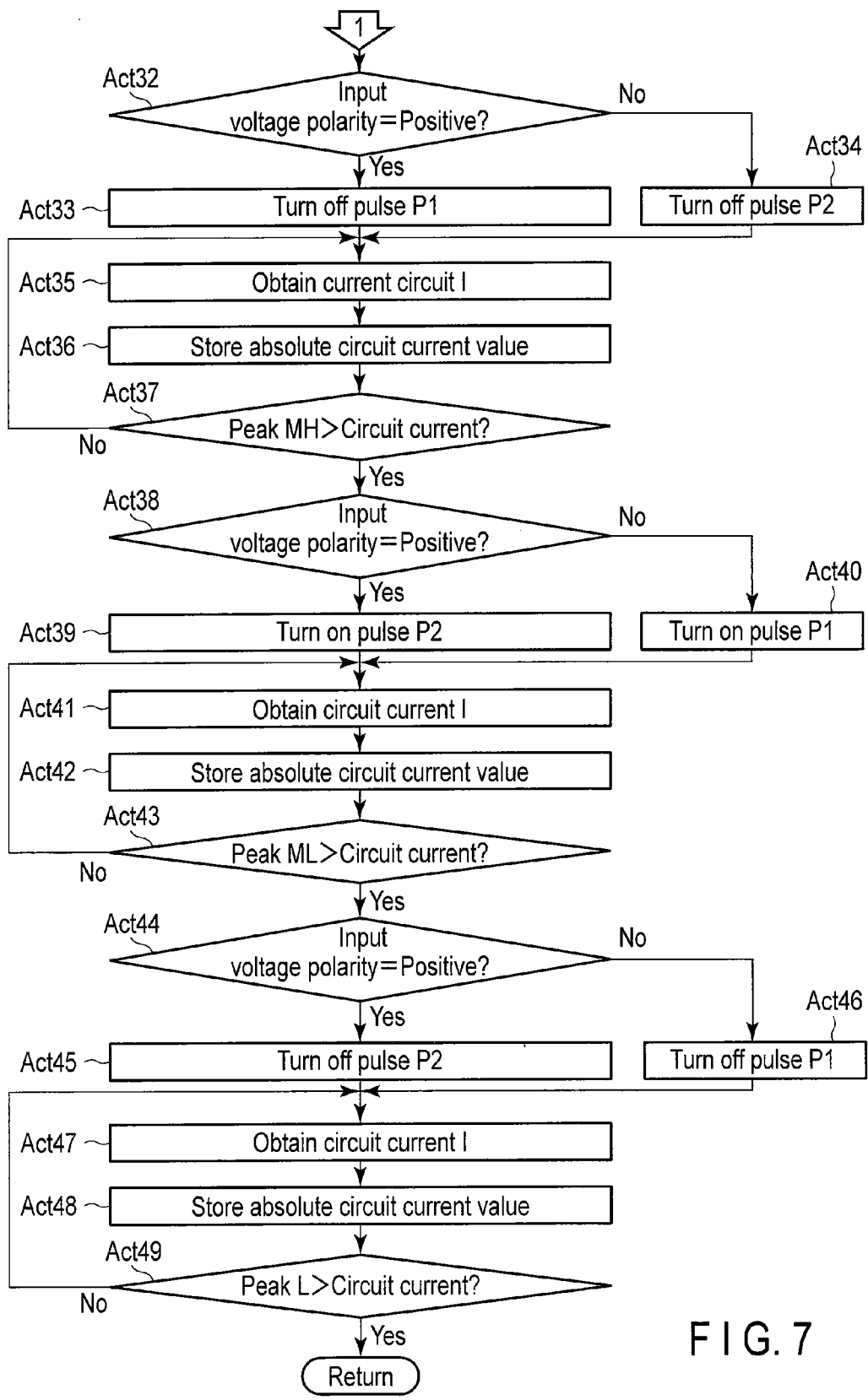
FIG. 7 is a flowchart showing the latter half of a control procedure of a controller in the second embodiment.

FIGS. 6 and 7 are flowcharts showing a control procedure of the controller 110. Also in the second embodiment, the controller 110 periodically calculates a corrected output voltage value (output voltage Vout-reference voltage Vref), and integrates the corrected output voltage value at a low frequency.

At the timing to start supplying power to the load 104 (a pulse output cycle), the controller 110 determines the low-frequency integrated value of the corrected output voltage value as a first feedback coefficient K1. Further, the controller 110 determines the value obtained by multiplying the first feedback coefficient K1 by a certain ratio a (1>a>0) as a second feedback coefficient K2, determines the value obtained by multiplying the first feedback coefficient K1 by a certain ratio b (1>b>a) as a third feedback coefficient K3, and determines the value obtained by multiplying the first feedback coefficient K1 by a certain ratio c (b>c>a) as a fourth feedback coefficient K4. The controller 110 stores the first to fourth feedback coefficients K1 to K4 (K1>K3>K4>K2) in memory (Act 21: a rated current value determinator).

Similarly to the operations of Act 2 to Act 4 in the first embodiment, the controller 110 takes in the input voltage Vin (Act 22), determines the polarity of the input voltage Vin (Act 23), and stores flag data indicating the polarity and absolute input voltage value in memory (Act 24).

The controller 110 calculates a maximum rated current value (Peak H), a minimum rated current value (Peak L), a rated sub-pulse turn-on value (Peak MH), and a rated sub-pulse turn-off value (Peak ML) (Act 25). The maximum rated current value (Peak H) is the product of the absolute input voltage value and first feedback coefficient K1. The minimum rated current value (Peak L) is the product of the absolute input voltage value and second feedback coefficient K2. The rated sub-pulse turn-on value (Peak MH) is the product of the absolute input voltage value and third feedback coefficient K3. The rated sub-pulse turn-off value (Peak ML) is the product of the absolute input voltage value and fourth feedback coefficient K4.

The controller 110 determines the polarity of the input voltage Vin (Act 26). When the polarity of the input voltage Vin is positive (Yes in Act 26), the controller 110 turns on the first main pulse signal P1 (MP) (Act 27: a pulse signal output unit). When the polarity of the input voltage Vin is negative (No in Act 26), the controller 110 turns on the second main pulse signal P2 (MP) (Act 28: a pulse signal output unit).

The controller 110 takes in the circuit current I (Act 29), obtains an absolute circuit current value except a polarity from the circuit current I, and stores the value in memory (Act 30).

The controller 110 determines whether the absolute circuit current value reaches the maximum rated current value (Peak H) (Act 31). When the absolute circuit current value does not reach the maximum rated current value (Peak H) (No in Act 31), the controller 110 takes in the circuit current I (Act 29), obtains an absolute circuit current value, and stores the obtained value in memory (Act 30).

As described above, the controller 110 repeats the operations of Act 29 and Act 30 until the absolute circuit current value reaches the maximum rated current value (Peak H).

When the absolute circuit current value reaches the maximum rated current value (Peak H) (Yes in Act 31), the controller 110 determines the polarity of the input voltage Vin (Act 32). The controller 110 turns off the first main pulse signal P1 (MP) (Act 33) when the polarity of the input voltage Vin is positive (Yes in Act 32), and turns off the second main pulse signal P2 (MP) (Act 34) when the polarity of the input voltage Vin is negative (No in Act 32).

When the first main pulse signal P1 (MP) or second main pulse signal P2 (MP) turns off, the controller 110 takes in the circuit current I (Act 35), obtains an absolute circuit current value, and stores the obtained value in memory (Act 36).

The controller 110 determines whether the absolute circuit current value reaches the rated sub-pulse turn-on value (Peak MH) (Act 37). When the absolute circuit current value does not reach the rated sub-pulse turn-on value (Peak MH) (No in Act 37), the controller 110 takes in the circuit current I (Act 35), obtains an absolute circuit current value, and stores the obtained value in memory (Act 36).

As described above, the controller 110 repeats the operations of Act 35 and Act 36 until the absolute circuit current value reaches the rated sub-pulse turn-on value (Peak MH).

When the absolute circuit current value decreases to the rated sub-pulse turn-on value (Peak MH) (Yes in Act 37), the controller 110 determines the polarity of the input voltage Vin (Act 38). When the polarity of the input voltage Vin is positive (Yes in Act 38), the controller 110 turns on the second sub-pulse signal P2 (SP) (Act 39: a pulse signal output unit). When the polarity of the input voltage Vin is negative (No in Act 38), the controller 110 turns on the first sub-pulse signal P1 (SP) (Act 40: a pulse signal output unit).

When the first sub-pulse signal P1 (SP) or second sub-pulse signal P2 (SP) turns on, the controller 110 takes in the circuit current I (Act 41), obtains an absolute circuit current value, and stores the obtained value in memory (Act 42).

The controller 110 determines whether the absolute circuit current value reaches the rated sub-pulse turn-off value (Peak ML) (Act 43). When the absolute circuit current value does not reach the rated sub-pulse turn-off value (Peak ML) (No in Act 43), the controller 110 takes in the circuit current I (Act 41), obtains an absolute circuit current value, and stores the obtained value in memory (Act 42).

As described above, the controller 110 repeats the operations of Act 41 and Act 42 until the absolute circuit current value reaches the rated sub-pulse turn-off value (Peak ML).

When the absolute circuit current value reaches the rated sub-pulse turn-off value (Peak ML) (Yes in Act 43), the controller 110 determines the polarity of the input voltage Vin (Act 44). The controller 110 turns off the second sub-pulse signal P2 (SP) (Act 45) when the polarity of the input voltage Vin is positive (Yes in Act 44), and turns off the first sub-pulse signal P1 (SP) (Act 46) when the polarity of the input voltage Vin is negative (No in Act 44).

When the first sub-pulse signal P1 (SP) or second sub-pulse signal P2 (SP) turns off, the controller 110 takes in the circuit current I (Act 47), obtains an absolute circuit current value, and stores the obtained value in memory (Act 48).

The controller 110 determines whether the absolute circuit current value reaches the minimum rated current value (Peak L) (Act 49). When the absolute circuit current value does not reach the minimum rated current value (Peak L) (No in Act 49), the controller 110 takes in the circuit current I (Act 47), obtains an absolute circuit current value, and stores the obtained value in memory (Act 48).

As described above, the controller 110 repeats the operations of Act 47 and Act 48 until the absolute circuit current value decreases to the minimum rated current value (Peak L).

When the absolute circuit current value decreases to the minimum rated current value (Peak L) (Yes in Act 49), one cycle of pulse output is terminated. Then, the controller returns to the operation of Act 21 that is the first step of the control procedure, and moves to the next cycle. In other words, the controller 110 determines the first to fourth feedback coefficients K1 to K4 from the low-frequency integrated value of the corrected output voltage value. Thereafter, the controller 110 repeats the operations of Act 21 to Act 49 until supplying power to the load 104 is completed.

In the power conversion apparatus 200 configured as described above, when the polarity of the input voltage Vin is positive, the controller 110 sends the first pulse signal P1 to the first switch Q1 as a main pulse signal MP. The first main pulse signal P1 (MP) turns off when the circuit current I increases to a maximum rated current value (Peak H), and turns on when the circuit current decreases to a minimum rated current value (Peak L). In other words, the first pulse signal P1 turns on until the circuit current I reaches the maximum rated current value (Peak H) after decreasing to the minimum rated current value (Peak L). The first pulse signal P1 turns off until the circuit current I returns to the minimum rated current value (Peak L) after increasing to the maximum rated current value (Peak H).

When the polarity of the input voltage Vin is positive and the first main pulse signal P1 (MP) turns off, the controller 110 sends a second pulse signal P2 to the second switch Q2 as a sub-pulse signal SP. The second sub-pulse signal P2 (SP) turns on when the circuit current I reaches the rated sub-pulse turn-on value (Peak MH), and turns off when the circuit current decreases to the rated sub-pulse turn-off value (Peak ML).

Figure 8:
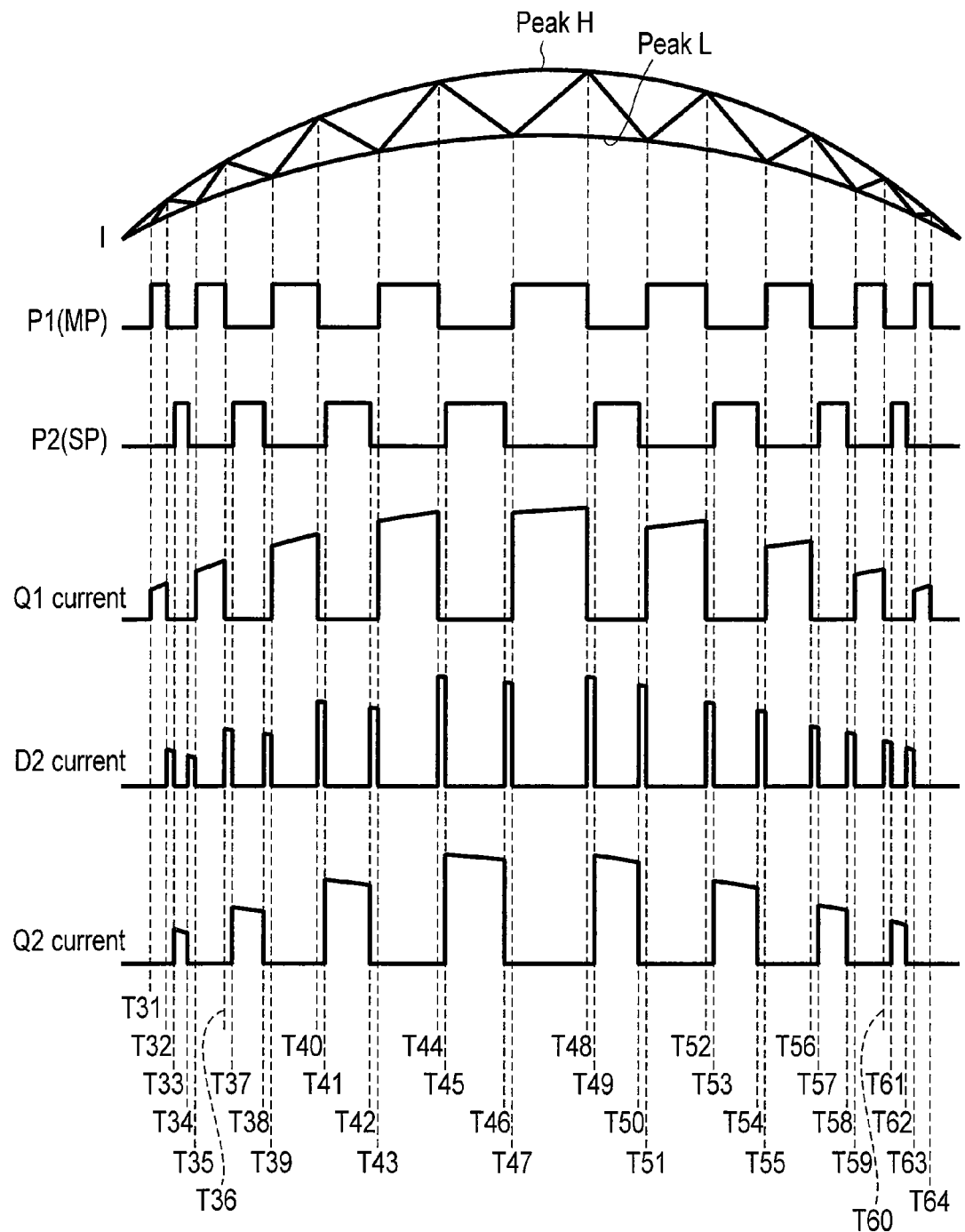
FIG. 8 is a timing chart showing a circuit current I, a first pulse signal P1, a second pulse signal P2, a current flowing through a first switch Q1, a current flowing trough a second diode, and a current flowing through a second switch Q2 when the polarity of the input voltage Vin is positive, in the second embodiment.

FIG. 8 shows a circuit current I, a first pulse signal P1 (MP), a second pulse signal P2 (SP), a current flowing through a first switch Q1, a current flowing through a second diode D2, and a current flowing through a second switch Q2 when the polarity of the input voltage Vin is positive. In an embodiment of the power conversion apparatus 200, a frequency of the AC power supply 101 is set to 50 Hz, and switching frequencies of the first and second switches Q1 and Q2 are set to 100 kHz. However, a description of the operation at a frequency of 100 kHz becomes complicated, and the operation at a very loose frequency is described in the drawing.

In FIG. 8, a minimum rated current value (Peak L) for the circuit current I is 70% of a maximum rated current value (Peak H). Though, not shown in the drawing, a rated sub-pulse turn-on value (Peak MH) for the circuit current I is 90% of a maximum rated current value (Peak H), and a rated sub-pulse turn-off value (Peak ML) is 80% of a maximum rated current value (Peak H). Values of the maximum rated current (Peak H), rated sub-pulse turn-on value (Peak MH), rated sub-pulse turn-off value (Peak ML), and minimum rated current (Peak L) are changed according to the input voltage Vin without changing the ratio.

As show in FIG. 8, the envelope curves of the maximum rated current value (Peak H) and minimum rated current value (Peak L) for the circuit current I are sinusoidal similar to the waveform of the input voltage Vin. Once the first pulse signal P1 (MP) is turned on, it is kept on until the circuit current I reaches the maximum rated current value (Peak H) (at timing T31, T35, T39, T43, T47, T51, T55, T59, and T63).

When the circuit current I reaches the maximum rated current value (Peak H) (at timing T32, T36, T40, T48, T52, T56, T60, and T64), the first main pulse signal P1 (MP) turns off. Thereafter, when the circuit current I decreases to the minimum rated current value (Peak L) (at timing T35, T39, T43, T47, T51, T55, T59, and T63), the first main pulse signal P1 (MP) turns on again. Thereafter, until the polarity of the input voltage Vin becomes negative, the first main pulse signal P1 (MP) repeats turning on and off as described above.

On the other hand, the second sub-pulse signal P2 (SP) turns off until the circuit current I reaches the maximum rated current value (Peak H). When the circuit current I decreases to the rated sub-pulse turn-on value (Peak MH) after reaching the maximum rated current value (Peak H) (at timing T33, T37, T41, T45, T49, T53, T57, and T61), the second sub-pulse signal P2 (SP) turns on. When the circuit current further decreases to the rated sub-pulse turn-off value (Peak ML) (at timing T34, T38, T42, T46, T50, T54, T58, and T62), the second sub-pulse signal P2 (SP) turns off. Thereafter, until the polarity of the input voltage Vin becomes negative, the second sub-pulse signal P2 (SP) repeats turning and off as described above.

When the first main pulse signal P1 (MP) turns on, the first switch Q1 conducts. When the first switch Q1 conducts, a closed circuit comprising an AC power supply 101, an inductor L1, a capacitor C1, and a first switch Q1 is formed. As a result, a current flows from the capacitor C1 to the first switch Q1 by the linear reactor action of the inductor L1 (in sections T31-T32, T35-T36, T39-T40, T43-T44, T47-T48, T51-T52, T55-T56, T59-T60, and T63-T64).

When the first main pulse signal P1 (MP) turns off, the first switch Q1 becomes nonconductive. When the first switch Q1 becomes nonconductive, the current flowing through the first switch Q1 becomes zero. At this time, the inductor L1 tends to flow a current in the same direction by the energy of a reactor. Therefore, a current flows into the smoothing capacitor C2 through the second diode D2 connected in parallel to the second switch Q2 (in sections T32-T33, T36-T37, T40-T41, T44-T45, T48-T49, T52-T53, T56-T57, and T60-T61).

Each time the first main pulse signal P1 (MP) turns on and off, the power conversion apparatus 200 repeats the above operation. As a result, the power conversion apparatus 200 charges the smoothing capacitor C2 while increasing the output voltage Vout across the output terminals 102 and 103.

When the first main pulse signal P1 (MP) turns off and the circuit current I decreases to the rated sub-pulse turn-on value (Peak MH), the second sub-pulse signal P2 (SP) turns on. The second sub-pulse signal P2 (SP) turns on until the circuit current I reaches the rated sub-pulse turn-off value (Peak ML), and turns off when the circuit current reaches the rated sub-pulse turn-off value (Peak ML).

When the second sub-pulse signal P2 (SP) turns on, the second switch Q2 conducts. When the second switch Q2 conducts, the current flowing into the smoothing capacitor C2 through the second diode D2 flows into the smoothing capacitor C2 through the second switch Q2 (in sections T33-T34, T37-T38, T41-T42, T45-T46, T49-T50, T53-T54, T57-T58, and T61-T62).

When the circuit current I reaches the rated sub-pulse turn-off value (Peak ML) and the second sub-pulse signal P2 (SP) turns off, the second switch Q2 becomes nonconductive. When the second switch Q2 becomes nonconductive, the current flowing into the smoothing capacitor C2 through the second switch Q2 flows again into the smoothing capacitor C2 through the second diode D2 (in sections T34-T35, T38-T39, T42-T43, T46-T47, T50-T51, T54-T55, T58-T59, and T62-T63).

Each time the second sub-pulse signal P2 (SP) turns on and off, the power conversion apparatus 200 repeats the above operation. As a result, the current I flowing into the smoothing capacitor C2 flows through the second diode D2 immediately after the first switch Q1 turns off and immediately before the first switch Q1 turns on, and flows through the second switch Q2 in the other time.

On the other hand, when the polarity of the input voltage Vin is negative, a second main pulse signal P2 (MP) is supplied from the controller 110 to the second switch Q2. The second main pulse signal P2 (MP) is kept on until the circuit current I reaches the maximum rated current (Peak H), and turns off when the circuit current reaches the maximum rated current value (Peak H). When the absolute value of the circuit current I decreases to the minimum rated current value (Peak L), the second main pulse signal P2 (MP) turns on again.

When the polarity of the input voltage Vin is negative and the second main pulse signal P2 (MP) turns off, the first sub-pulse signal P1 (SP) is supplied from the controller 110 to the first switch Q1. The first sub-pulse signal P1 (SP) turns on when the circuit current I reaches the rated sub-pulse turn-on value (Peak MH), and turns off when the circuit current decreases to the rated sub-pulse turn-off value (Peak ML).

Thereafter, until the polarity of the input voltage Vin becomes positive, the first sub-pulse signal P1 (SP) and second main pulse signal P2 (MP) repeat turning on and off as described above.

When the second main pulse signal P2 (MP) turns on, the second switch Q2 conducts. When the second switch Q2 conducts, a closed circuit comprising an AC power supply 101, an inductor L1, a capacitor C1, a second switch Q2, and a smoothing capacitor C2 is formed. At this time, the voltage of the smoothing capacitor C2 is higher than the AC voltage Va. As a result, the power conversion apparatus 200 is operated so that the charging voltage of the smoothing capacitor C2 returns to the AC power supply 101 through the second switch Q2 and inductor L1. Therefore, a current flows from the smoothing capacitor C2 to the second switch Q2.

When the second main pulse signal P2 (MP) turns off, the second switch Q2 becomes nonconductive. When the second switch Q2 becomes nonconductive, the current flowing through the second switch Q2 becomes zero. At this time, the inductor L1 tends to flow a current in the same direction by the energy of a reactor. Therefore, a current flows into the capacitor C1 through the first diode D1 connected in parallel to the first switch Q1.

Each time the second main pulse signal P2 (MP) turns on and off, the power conversion apparatus 200 repeats the above operation. As a result, the power conversion apparatus 200 recharges the capacitor C1.

When the second main pulse signal P2 (MP) turns off and the circuit current I decreases to the rated sub-pulse turn-on value (Peak MH), the first sub-pulse signal P1 (SP) turns on. The first sub-pulse signal P1 (SP) turns on until the circuit current I reaches the rated sub-pulse turn-off value (Peak ML), and turns off when the circuit current reaches the rated sub-pulse turn-off value (Peak ML).

When the first sub-pulse signal P1 (SP) turns on, the first switch Q1 conducts. When the first switch Q1 conducts, the current flowing into the capacitor C1 through the first diode D1 flows into the capacitor C1 through the first switch Q1.

When the circuit current I reaches the rated sub-pulse turn-off value (Peak ML) and the first sub-pulse signal P1 (SP) turns off, the first switch Q1 becomes nonconductive. When the first switch Q1 becomes nonconductive, the current flowing into the capacitor C1 through the first switch Q1 flows again into the capacitor C1 through the first diode D1.

Each time the first sub-pulse signal P1 (SP) turns on and off, the power conversion apparatus 200 repeats the above operation. As a result, the current I flowing into the capacitor C1 flows through the first diode D1 immediately after the second switch Q2 turns off and immediately before the second switch Q2 turns on, and flows through the first switch Q1 in the other time.

The polarity of the AC voltage Va alternately becomes positive and negative. Therefore, the power conversion apparatus 200 repeats charging of the smoothing capacitor C2 and recharging of the capacitor C1. In other words, the power conversion apparatus 200 charges the smoothing capacitor C2 after recharging the capacitor C1. Therefore, when the smoothing capacitor C2 is charged, the electric charge stored in the capacitor C1 is moved to the smoothing capacitor C2. Therefore, the pressor effect of the power conversion apparatus 200 is added. Therefore, the similar effects to those of the first embodiment can be obtained.

In addition, in the power conversion apparatus 200 of the second embodiment, the current, which has flowed through the second diode D2 since the first switch Q1 turns off, flows into the second switch Q2 after a lapse of minute delay time. When the current reaches the rated minimum current value (Peak L), or immediately before the first switch Q1 turns on, the current flows again into the second diode D2.

Similarly, since the second switch Q2 turns off, the current which has flowed through the first diode D1 flows into the first switch Q1 when a minute delay time elapses after the second switch Q2 turns off. The current flows again into the first diode D1 immediately before the second switch Q2 turns on.

The turn-on resistance of the first and second switches Q1 and Q2 is much lower than that of the diodes D1 and D2. Therefore, in the power conversion apparatus 200, the power conversion efficiency can be increased still further as compared with the power conversion apparatus 100 of the first embodiment.

Further, the power conversion efficiency can be increased much more by matching the timing to turn on/off the first and second switch Q1 and Q2. However, the semiconductor switches Q1 and Q2 may simultaneously turn on due to uneven characteristics. If the first and second switches Q1 and Q2 simultaneously turn on, a through-current flows and shorts the circuit.

To prevent such a defect, in the power conversion apparatus 200, the second switch Q2 turns on when a minute delay time elapses after the first switch Q1 turns on. Contrarily, the first switch Q1 turns on when a minute delay time elapses after the second switch Q2 turns off. Therefore, the first and second switches Q1 and Q2 do not simultaneously turn on in any section, and a defect to cause a short circuit does not occur.

Third Embodiment

A third embodiment is explained with reference to FIGS. 9 to 12. The circuit configuration of a power conversion apparatus 300 is similar to that of the first embodiment. Therefore, FIG. 1 is used, and the parts common to those in FIG. 1 are given the same reference numbers, and detailed explanation therefore is omitted.

Figure 9:
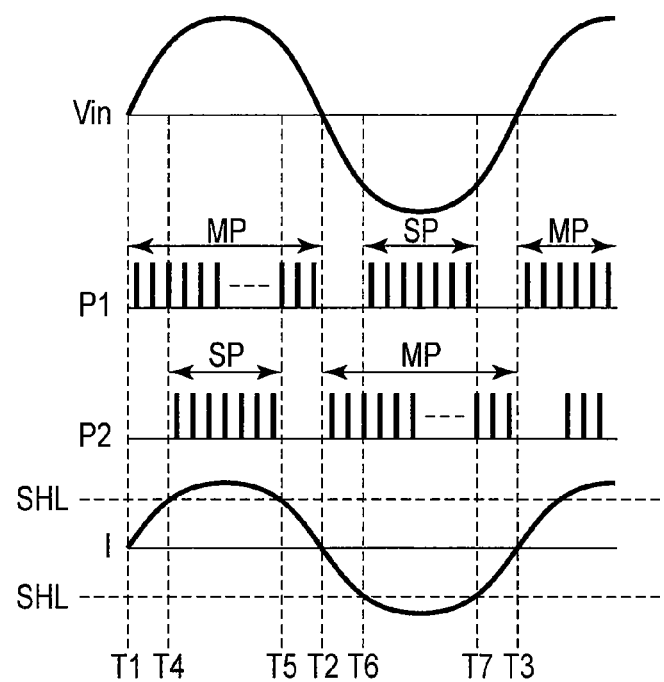
FIG. 9 is a timing chart showing the relationship between an input voltage Vin, a circuit current I, and first and second pulse signals P1 and P2 in the third embodiment.

FIG. 9 is a waveform chart showing the relationship between an input voltage Vin, a circuit current I, and first and second pulse signals P1 and P2 in the power conversion apparatus 300. In FIG. 9, the polarity of AC voltage Va is positive in sections T1 and T2. In the positive polarity sections, the controller 110 generates a first pulse signal P1 at a frequency far higher than a cycle of the AC voltage Va. In the third embodiment, a first pulse signal P1 in a section where the polarity of the AC voltage Va is positive is called a main pulse signal MP for a first switch Q1.

Further, as in sections T4 and T5 where the polarity of the AC voltage Va is positive, when the circuit current I flowing through the inductor L exceeds a threshold value SHL, the controller 110 generates a second pulse signal P2, each time the first pulse signal P1 turns off. In the third embodiment, a second pulse signal P2 in sections T4 and T5 is called a sub-pulse signal SP for a second switch Q2.

In FIG. 9, the polarity of the AC voltage Va is negative in sections T2 and T3. In the negative polarity sections, the controller 110 generates a second pulse signal P2 at a frequency far higher than a cycle of the AC voltage Va. In the third embodiment, a second pulse signal P2 in a section where the polarity of the AC voltage Va is negative is called a main pulse signal MP for the second switch Q2.

Further, as in sections T6 and T7 where the polarity of the AC voltage Va is negative, when the circuit current I flowing through the inductor L exceeds a threshold value SHL, the controller 110 generates a first pulse signal P1 each time the second pulse signal P2 turns off. In the third embodiment, a first pulse signal P1 in sections T6 and T7 is called a sub-pulse signal SP for the first switch Q1.

In other words, also in the third embodiment, the first switch Q1 repeats conducting and non-conducting when the polarity of the AC voltage Va is positive, and the second switch Q2 repeats conducting and non-conducting when the polarity of the AC voltage Va is negative. As a result, the circuit current I flowing through the inductor L1 becomes sinusoidal similar to the input voltage Vin.

Figure 10:
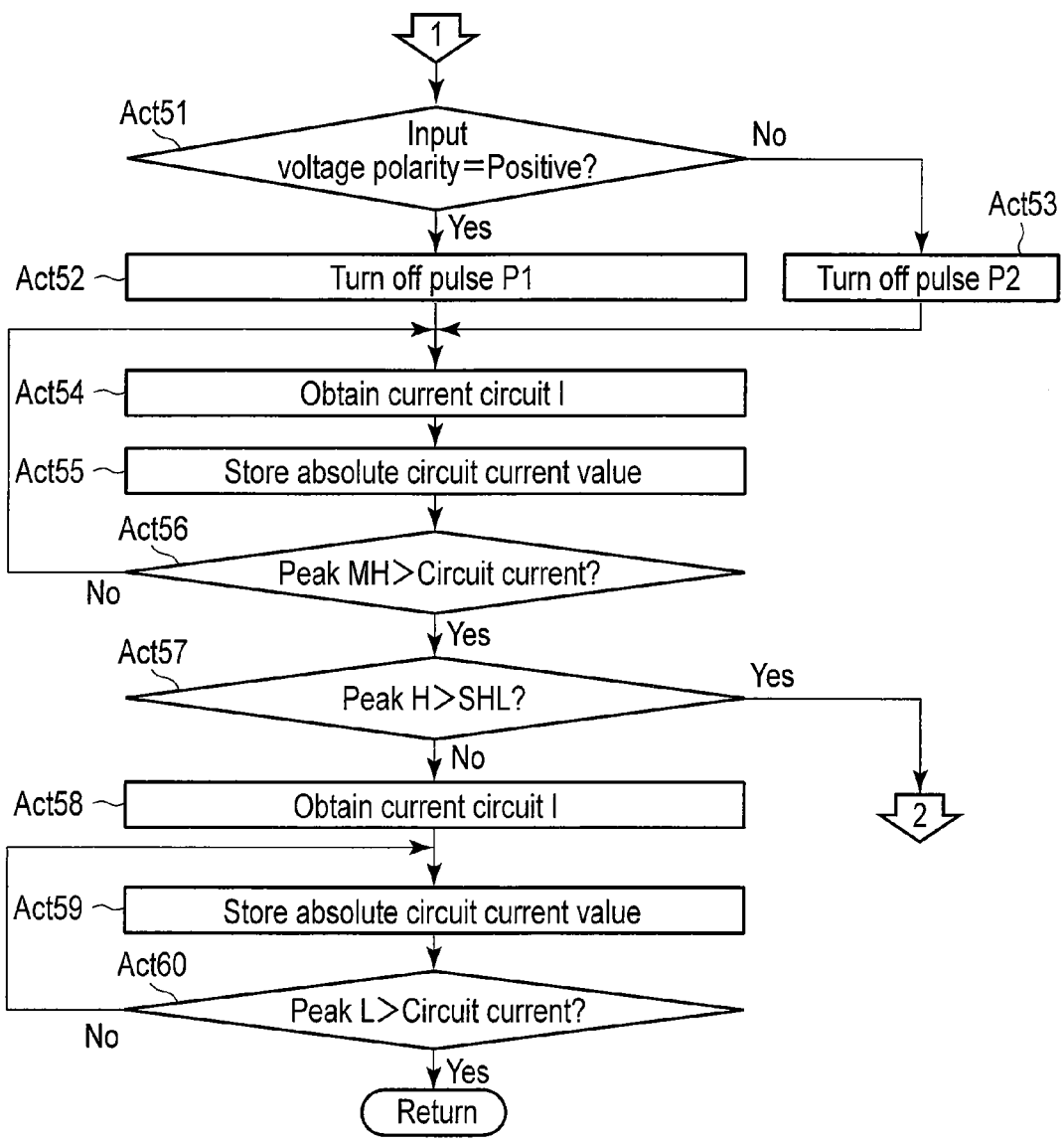
FIG. 10 is a flowchart showing the latter half of a control procedure of a controller in the third embodiment.
Figure 11:
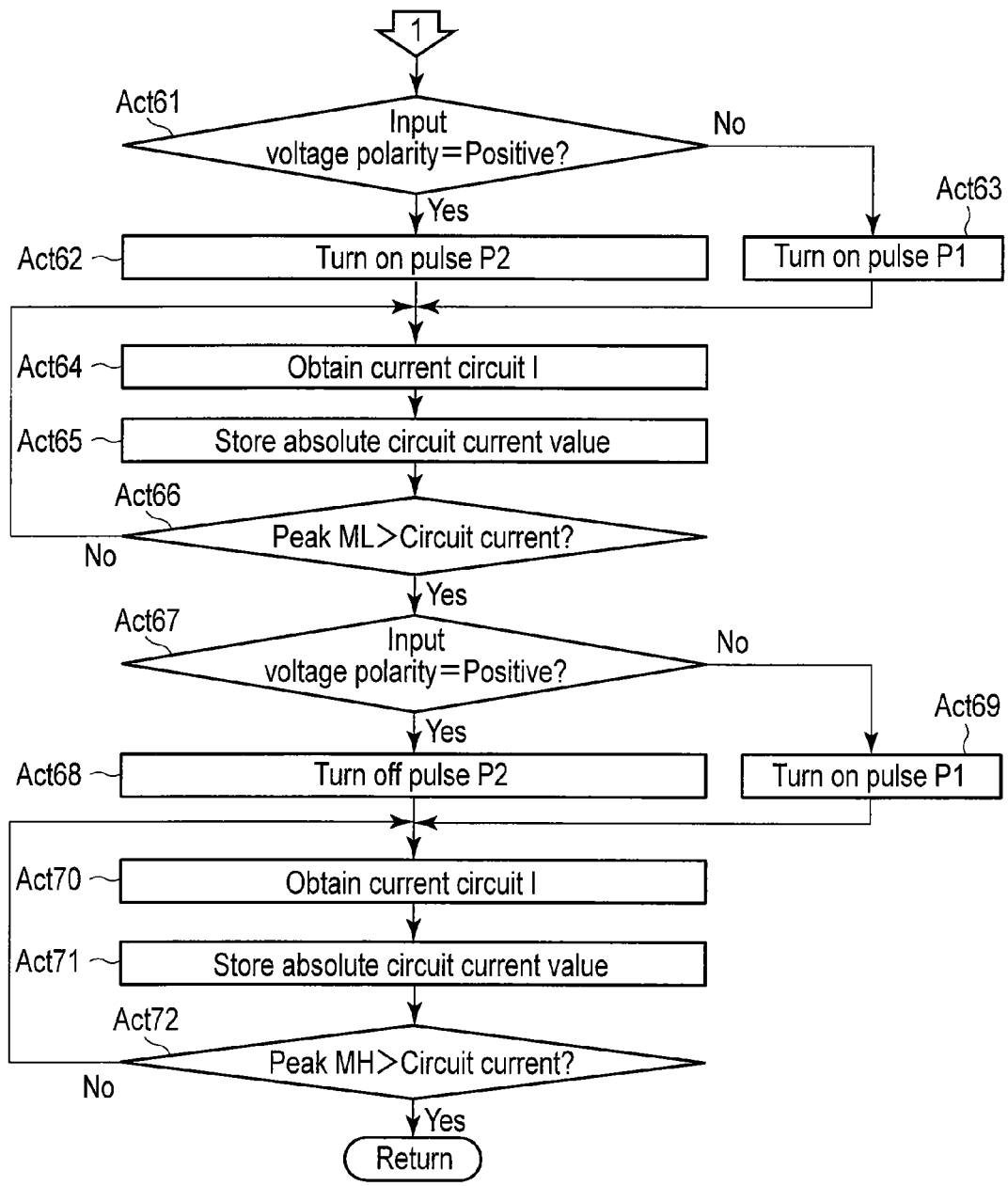
FIG. 11 is a flowchart showing a control procedure of a controller after "YES" is selected in step ST57 in FIG. 10.

FIGS. 10 and 11 are flowcharts showing a control procedure of the controller 110. FIG. 10 corresponds to FIG. 7 explained in the second embodiment. The control procedure shown in FIG. 6 explained in the second embodiment is also applied to the third embodiment. In other words, at the timing to start supplying power to the load 104 (a pulse output cycle), the controller of the power conversion apparatus 300 executes the operations of Act 21 to Act 31 explained in the second embodiment.

When an absolute circuit current reaches a maximum rated current value (Peak H) (Yes in Act 31), the controller 110 determines the polarity of the input voltage Vin (Act 51). When the polarity of the input voltage Vin is positive (Yes in Act 51), the controller 110 turns off the first main pulse signal P1 (MP) (Act 52). When the polarity of the input voltage Vin is negative (No in Act 51), the controller 110 turns off the second main pulse signal P2 (MP) (Act 53).

When the first main pulse signal P1 (MP) or second main pulse signal P2 (MP) turns off, the controller 110 takes in the circuit current I (Act 54), obtains an absolute circuit current value, and stores the obtained value in memory (Act 55).

The controller 110 determines whether the absolute circuit current value reaches the rated sub-pulse turn-on value (Peak MH) (Act 56). When the absolute circuit current value does not reach the rated sub-pulse turn-on value (Peak MH) (No in Act 56), the controller 110 takes in the circuit current I (Act 54), obtains an absolute circuit current value, and stores the obtained value in memory (Act 55).

As described above, the controller 110 repeats the operations of Act 54 and Act 55 until the absolute circuit current value reaches the rated sub-pulse turn-on value (Peak MH).

When the absolute circuit current value reaches the rated sub-pulse turn-on value (Peak MH) (Yes in Act 56), the controller 110 determines whether the rated maximum current value (Peak H) exceeds the preset threshold value SHL (Act 57: a first determinator).

When the rated maximum current value (Peak H) does not exceed the threshold value SHL (No in Act 57), the controller 110 takes in the circuit current I (Act 58), obtains an absolute circuit current value, and stores the obtained value in memory (Act 59).

The controller 110 determines whether the absolute circuit current value reaches the minimum rated current value (Peak L) (Act 60). When the absolute circuit current value does not reach the minimum rated current value (Peak L) (No in Act 60), the controller 110 takes in the circuit current I (Act 58), obtains an absolute circuit current value, and stores the obtained value in memory (Act 59).

As described above, the controller 110 repeats the operations of Act 58 and Act 59 until the absolute circuit current value reaches the minimum rated current value (Peak L).

When the absolute circuit current value decreases to the minimum rated current value (Peak L) (Yes in Act 60), one cycle of pulse output is terminated. Then, the controller returns to the operation of Act 21 that is a first step of the control procedure, and moves to the next cycle.

On the other hand, when the maximum rated current value (Peak H) exceeds the threshold value SHL (Yes in Act 57), as shown in FIG. 11, the controller 110 determines again the polarity of the input voltage Vin (Act 61). When the polarity of the input voltage Vin is positive (Yes in Act 61), the controller 110 turns on the second sub-pulse signal P2 (SP) (Act 62: a pulse signal output unit). When the polarity of the input voltage Vin is negative (No in Act 61), the controller 110 turns on the first sub-pulse signal P1 (SP) (Act 63: a pulse signal output unit).

When the first sub-pulse signal P1 (SP) or second sub-pulse signal P2 (SP) turns on, the controller 110 takes in the circuit current I (Act 64), obtains an absolute circuit current value, and stores the obtained value in memory (Act 65).

The controller 110 determines whether the absolute circuit current value reaches the rated sub-pulse turn-off value (Peak ML) (Act 66). When the absolute circuit current value does not reach the rated sub-pulse turn-off value (Peak ML) (No in Act 66), the controller 110 takes in the circuit current I (Act 64), obtains an absolute circuit current value, and stores the obtained value in memory (Act 65).

As described above, the controller 110 repeats the operations of Act 64 and Act 65 until the absolute circuit current value reaches the rated sub-pulse turn-off value (Peak ML).

When the absolute circuit current value reaches the rated sub-pulse turn-off value (Peak ML) (Yes in Act 66), the controller 110 determines the polarity of the input voltage Vin (Act 67). When the polarity of the input voltage Vin is positive (Yes in Act 67), the controller 110 turns off the second sub-pulse signal P2 (SP) (Act 68). When the polarity of the input voltage Vin is negative (No in Act 67), the controller 110 turns off the first sub-pulse signal P1 (SP) (Act 69).

When the first sub-pulse signal P1 (SP) or second sub-pulse signal P2 (SP) turns off, the controller 110 takes in the circuit current I (Act 70), obtains an absolute circuit current value, and stores the obtained value in memory (Act 71).

The controller 110 determines whether the absolute circuit current value reaches the minimum rated current value (Peak L) (Act 72). When the absolute circuit current value does not reach the minimum rated current value (Peak L) (No in Act 72), the controller 110 takes in the circuit current I (Act 70), obtains an absolute circuit current value, and stores the obtained value in memory (Act 71).

As described above, the controller 110 repeats the operations of Act 70 and Act 71 until the absolute circuit current value decreases to the minimum rated current value (Peak L).

When the absolute circuit current value decreases to the minimum rated current value (Peak L) (Yes in Act 72), one cycle of pulse output is terminated. Then, the controller returns to the operation of Act 21 that is a first step of the control procedure, and moves to the next cycle.

In the power conversion apparatus 300 configured as described above, similar to the second embodiment, when the polarity of the input voltage Vin is positive, the controller 110 supplies a first pulse signal P to the first switch Q1 as a main pulse signal MP. When the polarity of the input voltage Vin is positive and the first main pulse signal P1 (MP) turns off, the controller 110 supplies a second pulse signal P2 to the second switch Q2 as a sub-pulse signal SP.

In the third embodiment, only when a maximum rated current value (Peak H) exceeds a predetermined threshold value SHL, a second sub-pulse signal P2 (SP) is supplied to a second switch Q2.

FIG. 12 shows a circuit current I, a first pulse signal P1 (MP), a second pulse signal P2 (SP), a current flowing through a first switch Q1, a current flowing through a second diode D2, and a current flowing through a second switch Q2 when the polarity of the input voltage Vin is positive. In an embodiment of the power conversion apparatus 300, a frequency of the AC power supply 101 is set to 50 Hz, and switching frequencies of the first and second switches Q1 and Q2 are set to 100 kHz. However, a description of the operation at a frequency of 100 kHz becomes complicated, and the operation at a very loose frequency is described in the drawing.

In FIG. 12, a minimum rated current value (Peak L) for the circuit current I is 70% of a maximum rated current value (Peak H). Though, not shown in the drawing, a rated sub-pulse turn-on value (Peak MH) for the circuit current I is 90% of a maximum rated current value (Peak H), and a rated sub-pulse turn-off value (Peak ML) is 80% of a maximum rated current value (Peak H). Values of the maximum rated current (Peak H), rated sub-pulse turn-on value (Peak MH), rated sub-pulse turn-off value (Peak ML), and minimum rated current (Peak L) are changed according to the input voltage Vin without changing the ratio.

As show in FIG. 12, the envelope curves of the maximum rated current value (Peak H) and minimum rated current value (Peak L) for the circuit current I are sinusoidal similar to the waveform of the input voltage Vin. Once the first pulse signal P1 (MP) is turned on, it is kept on until the circuit current I reaches the maximum rated current value (Peak H) (at timing T71, T75, T79, T83, T87, T91, T93, and T95).

When the circuit current I reaches the maximum rated current value (Peak H) (at timing T72, T74, T76, T80, T84, T88, T92, T94, and T96), the first main pulse signal P1 (MP) turns off. Thereafter, when the circuit current I decreases to the minimum rated current value (Peak L) (at timing T73, T75, T79, T83, T87, T91, T93, and T95), the first main pulse signal P1 (MP) turns on again. Thereafter, until the polarity of the input voltage Vin becomes negative, the first main pulse signal P1 (MP) repeats turning on and off as described above.

On the other hand, the second sub-pulse signal P2 (SP) turns off until the circuit current I exceeds the threshold value SHL. When the maximum rated current value (Peak H) reaches the rated sub-pulse turn-on value (Peak MH), after exceeding the threshold value SHL (at timing T77, T81, T85, and T89), the second sub-pulse signal P2 turns on. When the maximum rated current value decreases to the rated sub-pulse turn-off value (Peak ML) (at timing T78, T82, T86, and T90), the second sub-pulse signal P2 (S) turns off. Thereafter, until the maximum rated current value (Peak H) of the circuit current I decreased to lower than the threshold value SHL, the second sub-pulse signal P2 (SP) repeats turning and off as described above.

When the first main pulse signal P1 (MP) turns on, the first switch Q1 conducts. When the first switch Q1 conducts, a closed circuit comprising an AC power supply 101, an inductor L1, a capacitor C1, and a first switch Q1 is formed. As a result, a current flows from the capacitor C1 to the first switch Q1 (in sections T71-T72, T73-T74, T75-T76, T79-T80, T83-T84, T87-T88, T91-T92, T93-T94, and T95-T96).

When the first main pulse signal P1 (MP) turns off, the first switch Q1 becomes nonconductive. When the first switch Q1 becomes nonconductive, the current flowing through the first switch Q1 becomes zero. At this time, the inductor L1 tends to flow a current in the same direction by the energy of a reactor. Therefore, a current flows into the smoothing capacitor C2 through the second diode D2 connected in parallel to the second switch Q2 (in sections T72-T73, T74-T75, T76-T79, T80-T83, T84-T87, T88-T91, T92-T93, and T94-T95).

Each time the first main pulse signal P1 (MP) turns on and off, the power conversion apparatus 300 repeats the above operation. As a result, the power conversion apparatus 300 charges the smoothing capacitor C2 while increasing the output voltage Vout across the output terminals 102 and 103.

When the maximum rated current value (Peak H) of the current circuit I exceeds the threshold value SHL, the first main pulse signal P1 turns off, and the circuit current I reaches the rated sub-pulse turn-on value (Peak MH), the second sub-pulse signal P2 (SP) turns on. The second sub-pulse signal P2 (SP) turns on until the circuit current I reaches the rated sub-pulse turn-off value (Peak ML), and turns off when the circuit current reaches the rated sub-pulse turn-off value (Peak ML).

Until the second sub-pulse signal P2 (SP) turns on, a current flows into the smoothing capacitor C2 through the second diode D2 (in sections T76-T77, T80-T81, T84-T85, and T88-T89). When the second sub-pulse signal P2 (SP) turns on, the second switch Q2 conducts. When the second switch Q2 conducts, the current flowing into the smoothing capacitor C2 through the second diode D2 flows into the smoothing capacitor C2 through the second switch Q2 (in sections T77-T78, T81-T82, T85-T86, and T89-T90).

When the circuit current I decreases to the rated sub-pulse turn-off value (Peak ML) and the second sub-pulse signal P2 (SP) turns off, the second switch Q2 becomes nonconductive. When the second switch Q2 becomes nonconductive, the current flowing into the smoothing capacitor C2 through the second switch Q2 flows again into the smoothing capacitor C2 through the second diode D2 (in sections T78-T79, T82-T83, T86-T87, and T90-T91).

Each time the second sub-pulse signal P2 (SP) turns on and off, the power conversion apparatus 300 repeats the above operation. As a result, when the maximum rated current value (Peak H) of the circuit current I exceeds the threshold value SHL, the current I flowing into the smoothing capacitor C2 flows through the second diode D2 immediately after the first switch Q1 turns off and immediately before the first switch Q1 turns on, and flows through the second switch Q2 in the other time.

As described above, in the power conversion apparatus 300, when the circuit current I is high, a sub-pulse signal SP is generated, so that the current flowing through the diodes D1 and D2 is bypassed through the first switch Q1 or second switch Q2. When the circuit current I is low, the effect of bypassing the current through the first Q1 or second switch Q2 is small, and power to drive the semiconductor switches Q1 and Q2 is required. Therefore, in the power conversion apparatus 300 of the third embodiment, a sub-pulse signal SP is generated only when the circuit current I is high, thereby the conversion efficiency can be increased higher than the power conversion apparatus 200 of the second embodiment.

Fourth Embodiment

Figure 13:
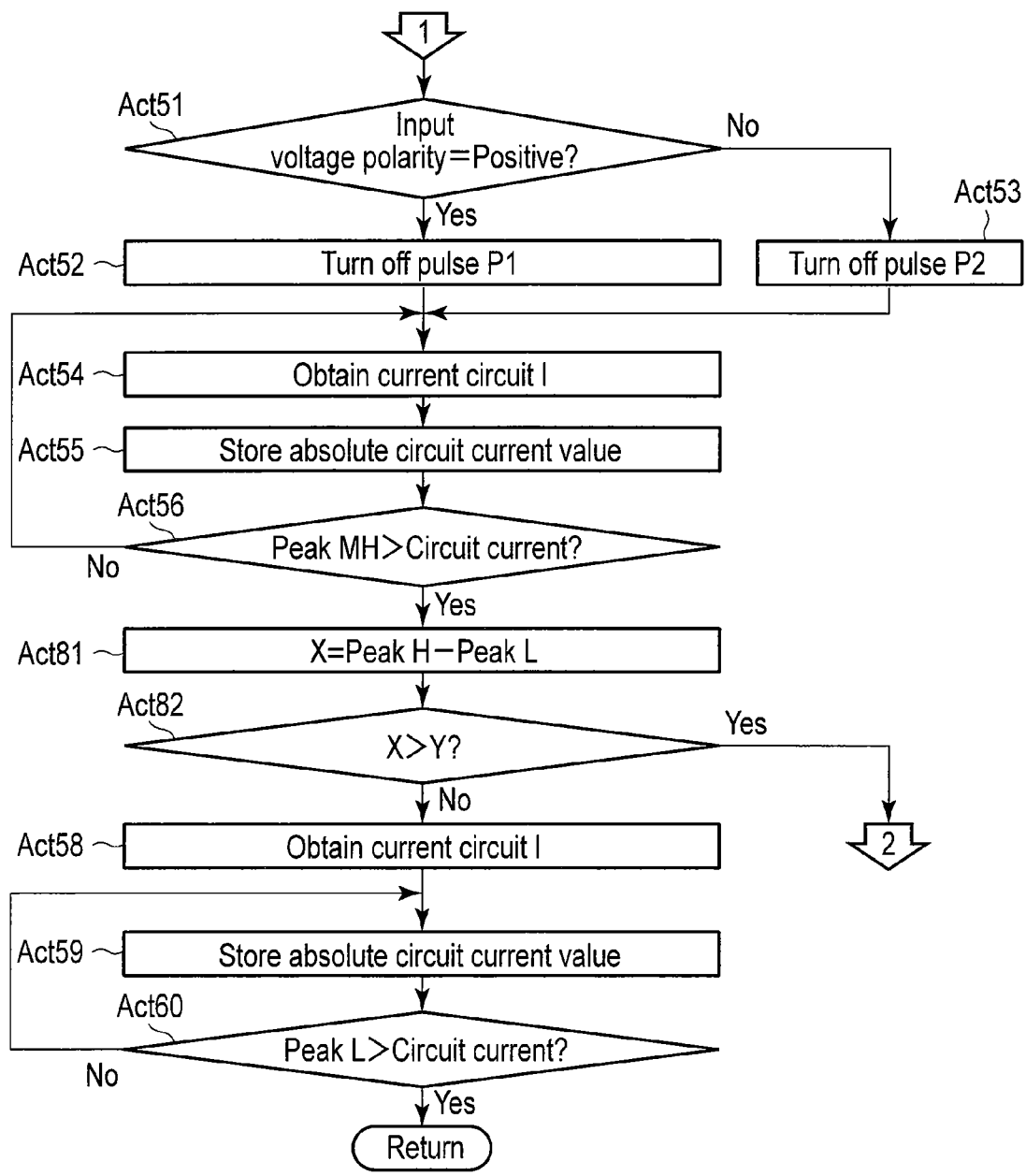
FIG. 13 is a flowchart showing the latter half of a control procedure of a controller in a fourth embodiment.

A fourth embodiment is explained with reference to FIG. 13. In a power conversion apparatus 400 of the fourth embodiment, the control procedure of the controller 110 in the power conversion apparatus 300 of the third embodiment is partially changed. FIG. 13 corresponds to FIG. 10 explained in the third embodiment. Therefore, the parts common to those in FIG. 10 are given the same reference numbers.

The control procedure shown in FIG. 6 explained in the second embodiment is applicable to the fourth embodiment. In other words, at the timing to start supplying power to the load 104 (a pulse output cycle), a controller 110 of the power conversion apparatus 400 executes the operations of Act 21 to Act 31 explained in the second embodiment.

As seen by comparing FIG. 10 and FIG. 13, in the controller 110 of the power conversion apparatus 400, operations after the absolute circuit current value reaches the rated sub-pulse turn-on value (Peak MH) in Act 56 are different from the third embodiment. In other words, in the fourth embodiment, the controller 110 calculates a value X that is obtained by subtracting a minimum rated current value (Peak L) from a maximum rated current value (Peak H) (Act 81). The controller 110 determines whether the calculated value X is higher than a predetermined value Y (Act 82: a second determinator).

When the calculated value X is lower than the predetermined value Y (No in Act 82), the controller executes the operations of Act 58 to Act 60 in the third embodiment. When the calculated value X is higher than the predetermined value Y (Yes in Act 82), the controller executes the operations of Act 61 to Act 72 (refer to FIG. 11).

In the third embodiment, to bypass the current flowing through the diodes D1 and D2 through the first or second switch Q1 or Q2, the power conversion apparatus 300 generates a sub-pulse signal SP when the maximum rated value (Peak H) of the circuit current I exceeds the predetermined threshold value SHL. In the fourth embodiment, the power conversion apparatus 400 generates a sub-pulse signal SP when the deviation X between the maximum rated current value (Peak H) and minimum rated current value (Peak L) of the circuit current I is higher than the predetermined value Y.

When the maximum rated current value (Peak H) of the circuit current I is low, the deviation X between the maximum rated current value (Peak H) and minimum rated current value (Peak L) is low. Therefore, the power conversion apparatus 400 of the fourth embodiment can provide the effect similar to the power conversion apparatus 300 of the third embodiment.

Modifications of the embodiments are explained hereinafter.

In the first to fourth embodiments, a minimum rated current value (Peak L) of the circuit current is 70% of a maximum rated current value (Peak H). However, this ratio is not limited to 70%, and may be 80% or lower than 60%.

For example, as shown in FIG. 14, a minimum rated current value (Peak L) may be set to near zero. By this way, a current waveform becomes close to triangular, and a current difference is easy to detect. Therefore, as in the second, third and fourth embodiments, when a rated sub-pulse turn-on value (Peak MH) and rated sub-pulse turn-off value (Peak ML) are used in addition to a maximum rated current value (Peak H) and minimum rated current value (Peak L), detection of each signal becomes easy. Such embodiments are useful for power conversion of relatively small capacity. Even in case of large capacity, they are useful for driving in a state close to no load.

In the second, third and fourth embodiments, the rated sub-pulse turn-on value (Peak MH) of the circuit current I is 90% of the maximum rated current value (Peak H), and the rated sub-pulse turn-off value (Peak ML) is 80% of the maximum rated current value (Peak H). However, the ratios are not necessarily limited to these values, unless the relationship of maximum rated current value (Peak H)>rated sub-pulse turn-on value (Peak MH)>rated sub-pulse turn-off value (Peak ML)>minimum rated current value (Peak L) is maintained. A rated sub-pulse turn-on value (Peak MH) is desirably close to a maximum rated current value (Peak H), and a rated sub-pulse turn-off value (Peak ML) is desirably close to a minimum rated current value (Peak L). In this way, a period to conduct semiconductor switches Q1 and Q2 by a sub-pulse signal SP becomes long, and the power conversion efficiency is further increased.

In each embodiment, a commercial power supply of 100 V (50/60 Hz) is used as an AC power supply. However, an AC power supply is not limited to a 100-V commercial power supply. For example, a commercial power supply of 200 to 220 V (50/60 Hz) may be used as an input power supply, and may be converted to a desired DC voltage for supplying power to a load.

FIG. 15 shows waveforms showing a voltage change during startup when power of 100 and 200 V AC are applied. When 100 V AC is applied, a voltage charged in a smoothing capacitor C2 is about 200 V as indicated by E1 in FIG. 15. On the other hand, when 200 V AC is supplied, a voltage charged in the smoothing capacitor C2 is about 400 V as indicated by E2 in FIG. 15. In either case, when switching is started (at timing t0), an output voltage is controlled to be equal to a reference voltage (600 V in this example).

In each embodiment, the circuit shown FIG. 1 is used as a basic configuration. However, a basic configuration is not limited to the one shown in FIG. 1. Other examples of basic configuration are shown in FIGS. 16 and 17.

FIG. 16 shows a circuit diagram of a modification, in which a first external diode D1 connected in parallel to a first semiconductor switch Q1 and a second diode D2 connected in parallel to a second semiconductor switch Q2 are omitted. Semiconductor switches Q1 and Q2 have a built-in body diode. In the circuit shown in FIG. 16, body diodes of the semiconductor switches Q1 and Q2 are used instead of the external diodes D1 and D2.

FIG. 17 shows another modification, in which mechanical switches S1 and S2 are used as a pair of switches operated by first and second pulse signals P1 and P2, instead of semiconductor switches Q1 and Q2. A semiconductor switch such as a triac having no body diode can be used instead of the mechanical switches S1 and S2.

Further, an inductor L1 and a capacitor C1 connected to an AC power supply 101 are connected in series. One end of the capacitor C1 can be connected to one end of the AC power supply 101, and the other can be connected to the semiconductor switch Q1 or mechanical switch S1 through the inductor L1.

A position to detect a circuit current I is not limited to the position indicated in each embodiment. For example, a current flowing through the AC power supply 101 and inductor L1 may be detected as a circuit current I, by connecting the inductor L1 to one end of the AC power supply 101 through current detectors 501 and 602. Or, a secondary winding L2 is provided in the inductor L1, and the circuit current I may be detected from the voltage generated in the secondary winding L2.

Low-resistance resistors R1 and R2 may be connected to the first and second semiconductors switches Q1 and Q2, and peak current detectors 81 and 82 may be connected to both ends of the low-resistance resistors R1 and R2. A peak current may be detected by converting a current flowing through the low-resistance resistors R1 and R2 to a voltage value.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power conversion apparatus comprising:
   a circuit segment comprising an inductor and a capacitor connected in series, the circuit segment connected to a first end of an AC power supply;
   a first switch having a first end connected to the first end of the AC power supply via the circuit segment, and a second end connected to a second end of the AC power supply, wherein the first switch conducts when a first pulse signal turns on, and becomes nonconductive when the first pulse signal turns off;
   a second switch having a first end connected to a node that connects the first end of the first switch and the circuit segment, and a second end connected via a smoothing capacitor to a node that connects the second end of the first switch and the second end of the AC power supply, wherein the second switch conducts when a second pulse signal turns on, and becomes nonconductive when the second pulse signal turns off;
   an input voltage detector which detects a voltage of the AC power supply as an input voltage;
   a circuit current detector which detects a circuit current flowing through the inductor;
   an output voltage detector which detects voltage at both ends of the smoothing capacitor as an output voltage;
   a rated current value determinator which determines, in each of a plurality of pulse output cycles, a peak value of circuit current and a lower limit value of circuit current that is lower than the peak value, the determination being based on a corrected output voltage obtained by subtracting a predetermined reference voltage from an output voltage detected by the output voltage detector, and an input voltage detected by the input voltage detector; and
   a pulse signal output unit which outputs one of the first and second pulse signals at a start of a pulse output cycle, continues outputting said first or second pulse signal until the circuit current detected by the circuit current detector reaches the peak value, stops outputting said first or second pulse signal when the circuit current reaches the peak value, and thereafter, begins a next pulse output cycle when the circuit current decreases to the lower limit value, wherein the first pulse signal is outputted to the first switch when a polarity of the input voltage is positive and the second pulse signal is outputted to the second switch when the polarity of the input voltage is negative.

2. The apparatus of claim 1, wherein the first and second switches are semiconductor switches having a built-in body diode.

3. The apparatus of claim 1, wherein a diode is externally added in parallel to the first and second switches.

4. The apparatus of claim 1, wherein the rated current value determinator further determines a rated turn-on value close to the peak value, and a rated turn-off value close to the lower limit value, each of which is between the peak value and lower limit value.

5. The apparatus of claim 4, wherein the pulse signal output unit further outputs a sub-pulse signal when the circuit current detected by the circuit current detector decreases to the rated turn-on value after reaching the peak value, and thereafter, stops outputting said sub-pulse signal when the circuit current decreases to the rated turn-off value, and wherein the sub-pulse signal is outputted to the second switch when the polarity of the input voltage is positive and the sub-pulse signal is outputted to the first switch when the polarity of the input voltage is negative.

6. The apparatus of claim 4, further comprising a first determinator which determines whether the peak value determined by the rated current value determinator is higher than a predetermined value.

7. The apparatus of claim 6, wherein if the first determinator determines that the peak value is higher than the predetermined value, the pulse signal output unit further outputs a sub-pulse signal when the circuit current detected by the circuit current detector decreases to the rated turn-on value after reaching the peak value, and, thereafter, stops outputting said sub-pulse signal when the circuit current decreases to the rated turn-off value, and wherein the sub-pulse signal is outputted to the second switch when the polarity of the input voltage is positive and the sub-pulse signal is outputted to the first switch when the polarity of the input voltage is negative.

8. The apparatus of claim 4, further comprising a second determinator which determines whether a difference between the peak value determined by the rated current value determinator and the lower limit value is higher than the predetermined value.

9. The apparatus of claim 8, wherein if the second determinator determines that the difference is higher than the predetermined value, the pulse signal output unit further outputs a pulse signal when the circuit current detected by the circuit current detector decreases to the rated turn-on value after reaching the peak value, and thereafter, stops outputting said sub-pulse signal when the circuit current decreases to the rated turn-off value, and wherein the sub-pulse signal is outputted to the second switch when the polarity of the input voltage is positive and the sub-pulse signal is outputted to the first switch when the polarity of the input voltage is negative.

10. In a power conversion apparatus including
a circuit segment comprising an inductor and a capacitor connected in series to a first end of an AC power supply,
a first end of a first switch connected to the first end of the AC power supply via the circuit segment,
a second end of the first switch connected to a second end of the AC power supply, wherein the first switch is configured to conduct when a first pulse signal turns on, and to become nonconductive when the first pulse signal turns off,
a first end of a second switch connected to a node that connects the first end of the first switch and the circuit segment, and
a second end of the second switch connected via a smoothing capacitor to a node that connects the second end of the first switch and the second end of the AC power supply, wherein the second switch is configured to conduct when
a second pulse signal turns on, and to become nonconductive when the second pulse signal turns off,
a power conversion method comprising:
in each of a plurality of pulse output cycles:
detecting an output voltage at both ends of the smoothing capacitor;
determining a corrected output voltage by subtracting a predetermined reference voltage from the output voltage;
detecting an input voltage at the AC power supply;
determining a peak value of circuit current and a lower limit value of circuit current that is lower than the peak value, the determination being based on the corrected output voltage and the input voltage; and
outputting one of the first and second pulse signals at the start of a pulse output cycle, continuing the outputting of said first or second pulse signals until the circuit current detected by a circuit current detector reaches the peak value, stopping the outputting of said first or second pulse signal when the circuit current detected by the circuit current detector reaches the peak value, and thereafter, beginning a next pulse output cycle when the circuit current decreases to the lower limit value, wherein the first pulse signal is outputted to the first switch when a polarity of the input voltage is positive and the second pulse signal is outputted to the second switch when the polarity of the input voltage is negative.

11. The method of claim 10, wherein the first and second switches are semiconductor switches having a built-in body diode.

12. The method of claim 10, wherein a diode is externally added in parallel to the first and second switches.

13. The method of claim 10, further comprising determining a rated turn-on value close to the peak value, and a rated turn-off value close to the lower limit value, each of which is between the peak value and lower limit value.

14. The method of claim 13, further comprising outputting a sub-pulse signal when the circuit current detected by the circuit current detector decreases to the rated turn-on value after reaching the peak value, and thereafter, stopping the outputting of said sub-pulse signal when the circuit current decreases to the rated turn-off value, wherein the sub-pulse signal is outputted to the second switch when the polarity of the input voltage is positive and the sub-pulse signal is outputted to the first switch when the polarity of the input voltage is negative.

15. The method of claim 13, further comprising determining whether the peak value is higher than a predetermined value.

16. The method of claim 15, further comprising, if the peak value is determined to be higher than the predetermined value, outputting a sub-pulse signal when the circuit current detected by the circuit current detector decreases to the rated turn-on value after reaching the peak value, and, thereafter, stopping the outputting of said sub-pulse signal when the circuit current decreases to the rated turn-off value, wherein the sub-pulse signal is outputted to the second switch when the polarity of the input voltage is positive and the sub-pulse signal is outputted to the first switch when the polarity of the input voltage is negative.

17. The method of claim 13, further comprising determining whether the difference between the peak value and the lower limit value is higher than a predetermined value.

18. The method of claim 17, further comprising, if the difference is determined to be higher than the predetermined value, outputting a sub-pulse signal when the circuit current detected by the circuit current detector decreases to the rated turn-on value after reaching the peak value, and thereafter, stopping the outputting of said sub-pulse signal when the circuit current decreases to the rated turn-off value, wherein the sub-pulse signal is outputted to the second switch when the polarity of the input voltage is positive and the sub-pulse signal is outputted to the first switch when the polarity of the input voltage is negative.

* * * * *